US011189294B2

(12) United States Patent
Sohn

(10) Patent No.: US 11,189,294 B2
(45) Date of Patent: Nov. 30, 2021

(54) ELECTRONIC DEVICE AND METHOD FOR REGISTERING NEW USER THROUGH AUTHENTICATION BY REGISTERED USER

(71) Applicant: Samsung Electronics Co., Ltd., Gyeonggi-do (KR)

(72) Inventor: Minjung Sohn, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 188 days.

(21) Appl. No.: 16/533,940

(22) Filed: Aug. 7, 2019

(65) Prior Publication Data

US 2020/0051572 A1 Feb. 13, 2020

(30) Foreign Application Priority Data

Aug. 7, 2018 (KR) .................. 10-2018-0091772

(51) Int. Cl.
*G10L 17/04* (2013.01)
*G10L 17/24* (2013.01)
*H04L 29/08* (2006.01)

(52) U.S. Cl.
CPC .............. *G10L 17/04* (2013.01); *G10L 17/24* (2013.01); *H04L 67/12* (2013.01)

(58) Field of Classification Search
CPC ......... G10L 17/04; G10L 17/24; G10L 15/22; G10L 17/22; G10L 17/00; H04L 67/12; H04L 12/2803; H04L 29/08; H04L 63/0861; H04L 9/3231; H04L 63/0884; H04L 29/06; G05B 19/4185; A63F 13/30; G06F 2221/2117; G06F 21/32
See application file for complete search history.

(56) References Cited

U.S. PATENT DOCUMENTS

| | | | |
|---|---|---|---|
| 9,876,788 B1* | 1/2018 | Ziraknejad | .............. G06F 21/34 |
| 2012/0253809 A1* | 10/2012 | Thomas | .................. G10L 17/24 |
| | | | 704/246 |
| 2013/0282840 A1* | 10/2013 | Agudelo | .............. G06Q 10/107 |
| | | | 709/206 |

(Continued)

FOREIGN PATENT DOCUMENTS

| | | |
|---|---|---|
| JP | 2016-99469 A | 5/2016 |
| JP | 6159440 B2 | 6/2017 |

(Continued)

OTHER PUBLICATIONS

Indian Search Report dated Nov. 26, 2020.

(Continued)

*Primary Examiner* — Huyen X Vo
(74) *Attorney, Agent, or Firm* — Cha & Reiter, LLC

(57) ABSTRACT

An electronic device and method are disclosed herein. The electronic device includes a speaker, microphone, processor and memory storing instructions, which implement the method, including: determining whether registration of a first user is required based on a first voice signal obtained through a microphone of the electronic device, when registration of the first user is required, requesting authentication of the first user by a second user preregistered at the electronic device, and when information authenticating the first user by the second user is received, registering the first user based on the received information.

20 Claims, 10 Drawing Sheets

(56) References Cited

U.S. PATENT DOCUMENTS

| | | | |
|---|---|---|---|
| 2014/0150071 A1* | 5/2014 | Castro | G06F 21/32 726/5 |
| 2017/0070478 A1* | 3/2017 | Park | H04L 67/28 |
| 2017/0359334 A1* | 12/2017 | Maddox | G06F 3/167 |
| 2017/0364868 A1* | 12/2017 | Ramachandran | G06Q 10/1091 |
| 2018/0084384 A1* | 3/2018 | Venkatraman | H04W 76/16 |
| 2018/0240463 A1* | 8/2018 | Perotti | G10L 17/22 |
| 2018/0357403 A1 | 12/2018 | Shnurenko et al. | |
| 2019/0243956 A1* | 8/2019 | Sheets | G06F 16/903 |
| 2019/0272831 A1* | 9/2019 | Kajarekar | G10L 15/22 |

FOREIGN PATENT DOCUMENTS

| | | | |
|---|---|---|---|
| KR | 10-2017-0024603 A | 3/2017 | |
| KR | 10-2017-0066987 A | 6/2017 | |
| WO | 2012/094520 A2 | 7/2012 | |

OTHER PUBLICATIONS

European Search Report dated Dec. 4, 2020.
"Google Home, user voice can distinguish . . . Different from Amazon Echo"; International Newspaper; Apr. 23, 2017; kookje.co.kr.
European Search Report dated Nov. 27, 2019.

\* cited by examiner

ELECTRONIC DEVICE AND METHOD FOR REGISTERING NEW USER THROUGH AUTHENTICATION BY REGISTERED USER

CROSS-REFERENCE TO RELATED APPLICATION(S)

This application is based on and claims priority under 35 U.S.C. § 119 to Korean Patent Application No. 10-2018-0091772, filed on Aug. 7, 2018, in the Korean Intellectual Property Office, the disclosure of which is herein incorporated by reference in its entirety.

BACKGROUND

Field

Certain embodiments relate to a method and an electronic device for registering a new user through authentication by a registered user.

Description of Related Art

With the enhancement of digital technology, electronic devices capable of providing various speech recognition services based on speech recognition technology have advanced in complexity and utility. Thanks to the development of speech recognition technology, electronic devices can provide speech recognition services, allowing users to formulate inputs and commands for the electronic devices based on "Natural Language Understanding" (NLU). Speech recognition services may be related to technology relevant to, for example, speech recognition, artificial intelligence (AI), and internet of things (IoT).

The above information is presented as background information only to assist with an understanding of the disclosure. No determination has been made, and no assertion is made, as to whether any of the above might be applicable as prior art with regard to the disclosure.

SUMMARY

When a user registers himself/herself to have authority regarding an electronic device providing a speech recognition service, the user should follow a procedure of generating an account or registering an account by using a user terminal. In this case, the user is required to input information necessary for the account through the user terminal, which may cause inconvenience. In addition, when a user does not own a user terminal, there is a problem that the user cannot register to use an electronic device providing a speech recognition service.

Certain embodiments of the disclosure provide an electronic device and a method for registering a new user through authentication by a registered user.

According to certain embodiments of the disclosure, an electronic device includes: a speaker, a microphone, and at least one processor, and a memory storing programming instructions, the programming instructions executable by the at least one processor to cause the electronic device to: determine whether registration of a first user is required based on a first voice signal obtained through the microphone, when registration of the first user is required, requesting authentication of the first user by a second user preregistered at the electronic device, and when information authenticating the first user by the second user is received, registering the first user based on the received information.

In addition, according to certain embodiments of the disclosure, an operation method of an electronic device includes: determining whether registration of a first user is required based on a first voice signal obtained through a microphone of the electronic device, when registration of the first user is required, requesting authentication of the first user by a second user preregistered at the electronic device, and when information authenticating the first user by the second user is received, registering the first user based on the received information.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
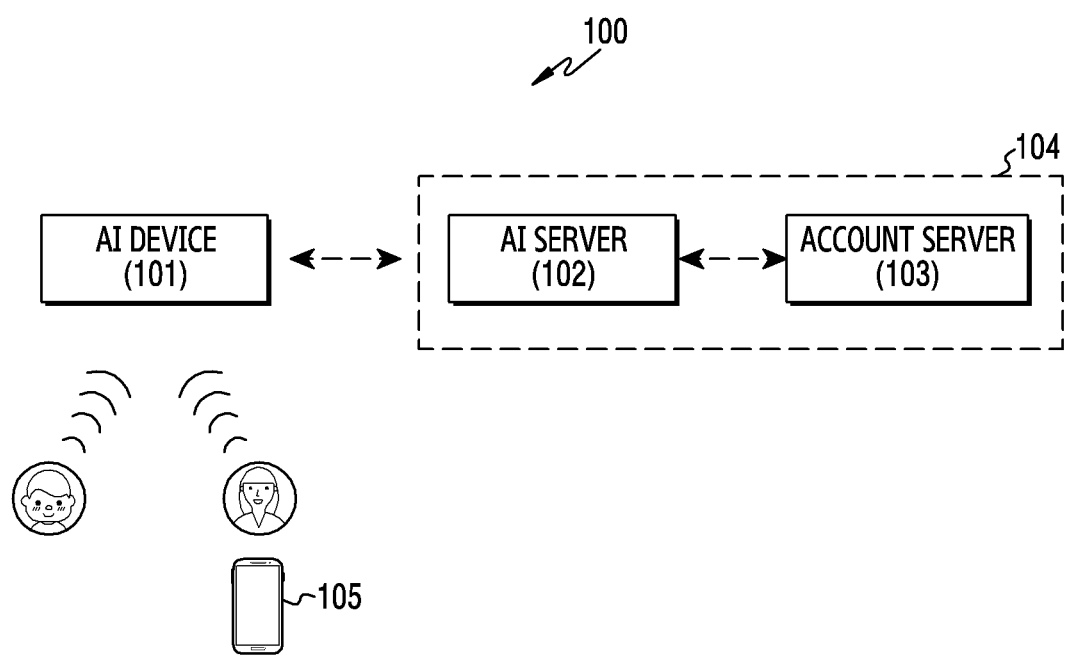
FIG. 1 is a view illustrating an example of a network environment including an AI device, an AI server, an account server, and a user device according to certain embodiments.

An electronic device (e.g., a user device, an artificial intelligence (AI) device, an Internet of Things (IoT) device) according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., a program) including one or more instructions that are stored in a storage medium (e.g., an internal memory or an external memory) that is readable by a machine (e.g., the electronic device, the user device, the AI device, the IoT device, a server). For example, a processor of the machine (e.g., the electronic device or AI device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

FIG. 1 illustrates an example of a network environment including an AI device, an AI server, an account server, and a user device according to certain embodiments.

Referring to FIG. 1, the network environment 100 includes the AI device 101, the AI server 102, the account server 103, and the user device 105.

The AI device 101 may perform functions of an AI agent or an AI assistant. The AI device 101 may include, for example, an AI speaker, but is not limited thereto. The AI device 101 may be implemented as various types of devices capable of performing the functions of the AI agent. For example, the AI device 101 in a home may be implemented through one of home appliances or may be implemented as a family hub.

The AI device 101 may be installed in a home to function as an AI assistant for a family, or may be installed in a public place to be used as a sharing device for a plurality of users. The functions or purpose of the AI device is not limited. For example, the AI device 101 may be installed in a private space such as a hotel room, and in this case, a user using the AI device 101 may continuously change.

The AI device 101 may register a user who wishes to use the AI device 101. The AI device 101 may give a registered user authority to use the AI device 101 by registering the user. For example, an action of registering a user by the AI device 101 may include an action of generating an account of the user. The action of registering a user by the AI device 101 may be performed based on a conversational dialogue with the user based on a voice signal, and based on communication with a server (for example, at least one of the AI server 102 or the account server 103). The AI device 101 may store information regarding an account of a registered user (for example, a profile) in a server (for example, at least one of the AI server 102 or the account server 103) connected with the AI device 101. However, this should not be considered as limiting, and the AI device 101 may directly store information regarding an account of a registered user in a memory of the AI device 101.

The user registered to use the AI device 101 may have authority of a designated level or higher with respect to the AI device 101. For example, the AI device 101 may provide a customized function to the registered user by using the information (for example, a profile, voiceprint information, a nickname, an appellation, etc.) regarding the account of the registered user. The function that the AI device 101 can provide to the registered user may be different from a function that the AI device 101 provides to an unregistered user. For example, the AI device 101 may provide weather information or time information to all of the registered user and the unregistered user. However, the AI device 101 may additionally provide the registered user with at least one of a function of informing a personal schedule of the registered user, a function of calling registered another user, a function of transmitting a message to registere another user, or a function of controlling an IoT device associated with the AI device 101. The AI device 101 may not provide the functions which are additionally provided to the registered user as described above to the unregistered user.

The AI device 101 may register a plurality of users and may provide customized services to the registered users, respectively. For example, the AI server 102 (or the account server 103) connected with the AI device 101 may store voiceprint information of users to register a user. The AI device 101 (or the AI server 102) may identify (or recognize) the plurality of users by using the voiceprint information. Accordingly, the AI device 101 may receive a voice input such as "Let me know 'my' schedule today." and may identify a user corresponding to the voice input among the registered users, and may provide a customized service to the user.

The user which will be described in the disclosure may include a first user and a second user. The first user may be a new user who is not registered to use the AI device 101. In certain embodiments, the AI device 101 may perform actions of identifying the first user who is not registered, and of registering the first user. For example, the AI device 101 may perform an action of generating an account of the first user for use of the AI device 101.

The second user may be a user who is already registered to use the AI device 101. For example, an account of the second user may be generated and/or registered for use of the AI device 101. Information regarding the account of the second user may be stored in a server (for example, at least one of the AI server 102 or the account server 103) connected with the AI device 101. The account of the second user for using the AI device 101 may be generated and/or registered through the user device 105 of the second user. The user device 105 of the second user may include, for example, a smartphone, a wearable device, a tablet PC, a computer device, or a portable multimedia device which is owned by the second user, but is not limited thereto.

In certain embodiments, the AI device 101 may request the already registered second user to authenticate the first user to register the first user. The AI device 101 may generate an account of the first user to register the first user, based on the first user being authenticated by the second user. The action of authenticating the first user by the second user may include at least one of an action of authenticating the first user by using a voice input of the second user obtained through a microphone of the AI device 101 (for example, an AI speaker), or an action of obtaining authentication information from the second user through the user device 105 of the second user.

The AI server 102 may be connected with the AI device 101 through a communication network, and may identify (recognize) utterance of a user or may identify (generate or select) a response corresponding to user's utterance to allow the AI device 101 to have conversational dialogues with the user.

For example, the AI server 102 may receive a user voice input from the AI device 101 through the communication network, and may change the user voice input to text data. The AI server 102 may identify (generator or select) information regarding an action (or operation) for performing a function based on the text data, or information regarding a parameter necessary for executing the action. The AI server 102 may generate a sequence of states for performing a task requested by a user. The task may be any action that can be provided by AI software (or application). The task may include, for example, searching a schedule, providing weather information, controlling an external electronic device (for example, an IoT device) associated with the AI device 101, or calling an electronic device (for example, the user device 105) registered at the AI device 101. The actions of the AI server 102 as described above may be provided by an AI system. The AI system may be a rule-based system or a neural network-based system (for example, a feedforward neural network (FNN), a recurrent neural network (RNN)). Alternatively, the AI system may be a combination of the above-described systems or other AI systems. According to an embodiment, the task or the action or a parameter for executing the action may be selected from a pre-defined set or may be generated in real time in response to a user request.

The AI server 102 may include, for example, an automatic speech recognition (ASR) module, a natural language understanding (NLU) module, a natural language generator (NLG) module, or a text-to-speech (TTS) module. The AI server 102 may include a communication circuit, a memory, and a processor. The processor may drive the ASR module, the NLU module, the NLG module, and the TTS module by executing a command stored in the memory. The AI server 102 may exchange data (or information) with an external electronic device (for example, the AI device 101, the account server 103, the user device 105) through the communication circuit.

According to an embodiment, the AI server 102 may convert a user input received from the AI device 101 into text data by using the ASR module. For example, the ASR module may include an utterance recognition module. The utterance recognition module may include an acoustic model and a language model. For example, the acoustic model may include information regarding a vocalization, and the language model may include unit phoneme information and information regarding a combination of unit phoneme information. The utterance recognition module may convert user utterance into text data by using the information regarding the vocalization and the information regarding the unit phoneme information. Information regarding the acoustic model and the language model may be stored in, for example, an automatic speech recognition database (ASR DB).

According to an embodiment, the AI server 102 may understand a user intent by performing syntactic analysis or sematic analysis by using the NLU module. The syntactic analysis may be performed by dividing a user input into grammatical units (for example, words, phrases, morphemes, etc.), and understanding what grammatical element each divided unit has. The semantic analysis may be performed by using sematic matching, rule matching, formula matching, or the like. Accordingly, the NLU module may obtain a domain and an intent corresponding to the user input, or a parameter (or slot) necessary for representing the intent.

According to an embodiment, the NLU module may understand the meaning of a word extracted from the user input by using linguistic characteristics (for example, grammatical elements) of the morpheme, phrase, or the like, and may determine the intent of the user by matching the understood meaning of the word with the domain and the intent.

According to an embodiment, the NLU module may determine the user's intent by using a natural language recognition database in which linguistic characteristics for understanding the intent of a user input are stored. According to another embodiment, the NLU module may determine the user's intent by using a personal language model (PLM). For example, the NLU module may determine the user's intent by using personal information (for example, information regarding a user account, a list of contacts, a music list). The PLM may be stored in the natural language recognition database.

According to an embodiment, the NLU module may determine an action for performing a function corresponding to the user input, or a parameter necessary for executing the action, based on the intent of the user input and the parameter. The AI server 102 may transmit information regarding the action to the AI device 101 or another external device (for example, an IoT server). For example, the IoT server may control an IoT device based on the information regarding the action being received.

According to an embodiment, the AI server 102 may change designated information into a text form by using the NLG module. The information changed to the text form may be a form of utterance of natural language. The designated information may be, for example, information regarding an additional input, information informing completion of the action corresponding to the user input, or information guiding an additional input of the user (for example, feedback information regarding the user input). The information changed to the text form may be transmitted to the AI device 101 or may be transmitted to the TTS module and may be changed to a voice form.

According to an embodiment, the AI server 102 may change information in a text form to information in a voice form by using the TTS module. The TTS module may receive information in a text form from the NLG module, may change the information in the text form to information in a voice form, and may transmit the information to the AI device 101. The AI device 101 may output the information in the voice form to a speaker.

According to an embodiment, one or more of the ASR module, the NLU module, the NLG module, or the TTS module may be implemented as one module in the AI server 102. Alternatively, one or more of the ASR module, the NLU module, the NLG module, or the TTS module may be implemented in the AI device 101. Accordingly, at least some function of the AI server 102 may be performed in the AI device 101.

The AI server 102 may perform voiceprint recognition with respect to a user's voice signal received from the AI device 101. The AI server 102 may extract voiceprint information from the user's voice signal. The AI server 102 may store the voiceprint information in the database of the AI server 102, or may temporarily store the voiceprint information. For example, the AI server 102 may store the voiceprint information of a user registered to use the AI device 101 in association with the account of the user. The AI server 102 may identify a user uttering a voice signal among one or more registered users, based on the database of the voiceprint information. For example, when the AI server 102 identifies the user uttering the voice signal as a new user who is not registered, the AI server 102 may temporarily store the voiceprint information of the voice signal.

The AI server 102 may store at least part of information (for example, a profile) regarding the account of a user registered for the AI device 101. For example, the AI server 102 may store voiceprint information of registered users, a relationship between registered users, and appellations that registered users call each other (for example, nicknames), as the information (for example, the profile) regarding the account of the registered user. For example, when the AI device 101 is installed in a home, family members may be registered as users of the AI device 101, and the AI server 102 may store a relationship or appellations of family members (for example, mother, son, nicknames such as "gwiyomi", which is Korean for a "cutie").

The account server 103 may store an account related to the user device 105. For example, the account server 103 may store a last name, a first name, a birth date, and an email of the user of the user device 105. The account server 103 may provide information regarding the account related to the user device 105 to the AI server 102.

The information regarding the account of the user registered for the AI device 101 may be stored in the AI server 102, or may be stored in the account server 103. For example, a part of information (for example, a profile) regarding the account of a registered user may be stored in the AI server 102, and the other part may be stored in the account server 103. According to an embodiment, the AI server 102 and the account server 103 may be implemented as one device (for example, a server 104). According to another embodiment, the AI server 102 and the account server 103 may be integrated into the AI device 101. For example, the information regarding the account of the user registered for the AI device 101 may be stored in the AI device 101. In certain embodiments, at least part of the functions of the AI server 102 and the account server 103 may be implemented through the AI device 101.

Figure 2:
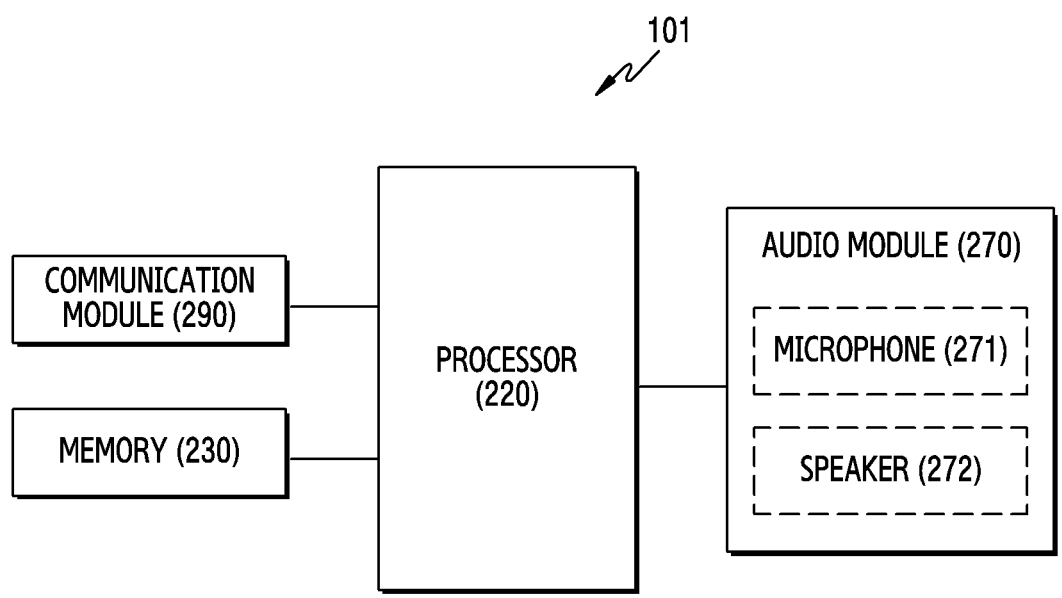
FIG. 2 is a view illustrating an example of a functional configuration of the AI device according to certain embodiments.

FIG. 2 illustrates an example of a functional configuration of the AI device 101 according to certain embodiments. The AI device 101 may be a device which performs the functions of an AI agent, and for example, may include an AI speaker.

Referring to FIG. 2, the AI device 101 may include a processor 220, a communication module 290, a memory 230, and an audio module 270. However, this should not be considered as limiting, and at least one of the above-described components may be omitted from the AI device 101 or one or more other components may be added.

The audio module 270 may convert a sound into an electric signal, and to the contrary, may convert an electric signal into a sound. The audio module 270 may include a microphone 271 as an input device, and may include a speaker 272 as an output device. The audio module 270 may obtain a sound from the outside through the microphone 271. In certain embodiments, the audio module 270 may obtain a voice signal of a first user and a voice signal of a second user through the microphone 271. The audio module 270 may convert an analogue audio signal corresponding to the obtained sound into a digital audio signal. The audio module 270 may perform various processing operations with respect to the digital audio signal. For example, the audio module 270 may perform a noise processing operation (for example, noise or echo attenuation) or a processing operation related to extraction of feature points with respect to one or more digital audio signals. In another example, the audio module 270 may transmit the digital audio signal to the processor 220, such that the processor 220 can perform the above-described processing operations. In still another example, at least part of the above-described processing operations may be performed by the AI server 102. In this case, the audio module 270 or the processor 220 may transmit the digital audio signal to the AI server 102 though the communication module 290, such that the AI server 102 can perform the above-described processing operations.

The audio module 270 may convert a digital audio signal into an analogue audio signal. For example, the audio module 270 may convert a digital audio signal received from the AI server 102 (for example, a digital audio signal processed by the processor 220) into an analogue audio signal. In certain embodiments, the digital audio signal received from the AI server 102 may correspond to a response of the AI device 101 to have conversational dialogues with the first user or the second user. The audio module 270 may output the converted analogue audio signal to the outside through the speaker 272.

The AI device 101 may have conversational dialogue with the unregistered first user or the already registered second user based on a voice by inputting through the microphone 271 and outputting through the speaker 272 as described above.

The communication module 290 may establish a communication link between the AI device 101 and an external electronic device (for example, the AI server 102, the account server 103, or the user device 105), and may perform communication through the established communication link. For example, the communication module 290 may transmit data corresponding to a user's voice signal obtained through the microphone 271 to the AI server 102. The communication module 290 may receive, from the AI server 102, data corresponding to a voice signal responding to the user's voice signal.

The processor 220 may control overall operations of the AI device 101. The processor 220 may receive commands of the other components (for example, the audio module 270, the communication module 290, the memory 230, or the like), and may interpret a received command, and may perform calculation or process data according to the interpreted command. The processor 220 may be implemented by software, may be implemented by hardware such as a chip, a circuitry, or the like, or may be implemented by a combination of software and hardware. The processor 220 may be one processor or may be a combination of a plurality of processors. A detailed operation of the processor 220 (or the AI device 101) according to certain embodiments will be described in detail below with reference to FIGS. 3 to 10.

The memory 230 may refer to a set of one or more memories. The memory 230 may execute commands stored in the memory 230 based on signaling with the processor 220. The memory 230 may store data and/or commands received or generated from the other components (for example, the processor 220, the communication module 290, the audio module 270). According to a certain embodiment, the memory 230 may store at least part of information (for example, a profile) regarding the account of a user registered to use the AI device 101. For example, when the AI server 102 (or the account server 103) is integrated into the AI device 101 and is implemented through the AI device 101, the memory 230 may store the information (for example, a profile) regarding the account of the user registered to use the AI device 101 in the form of a database.

Figure 3:
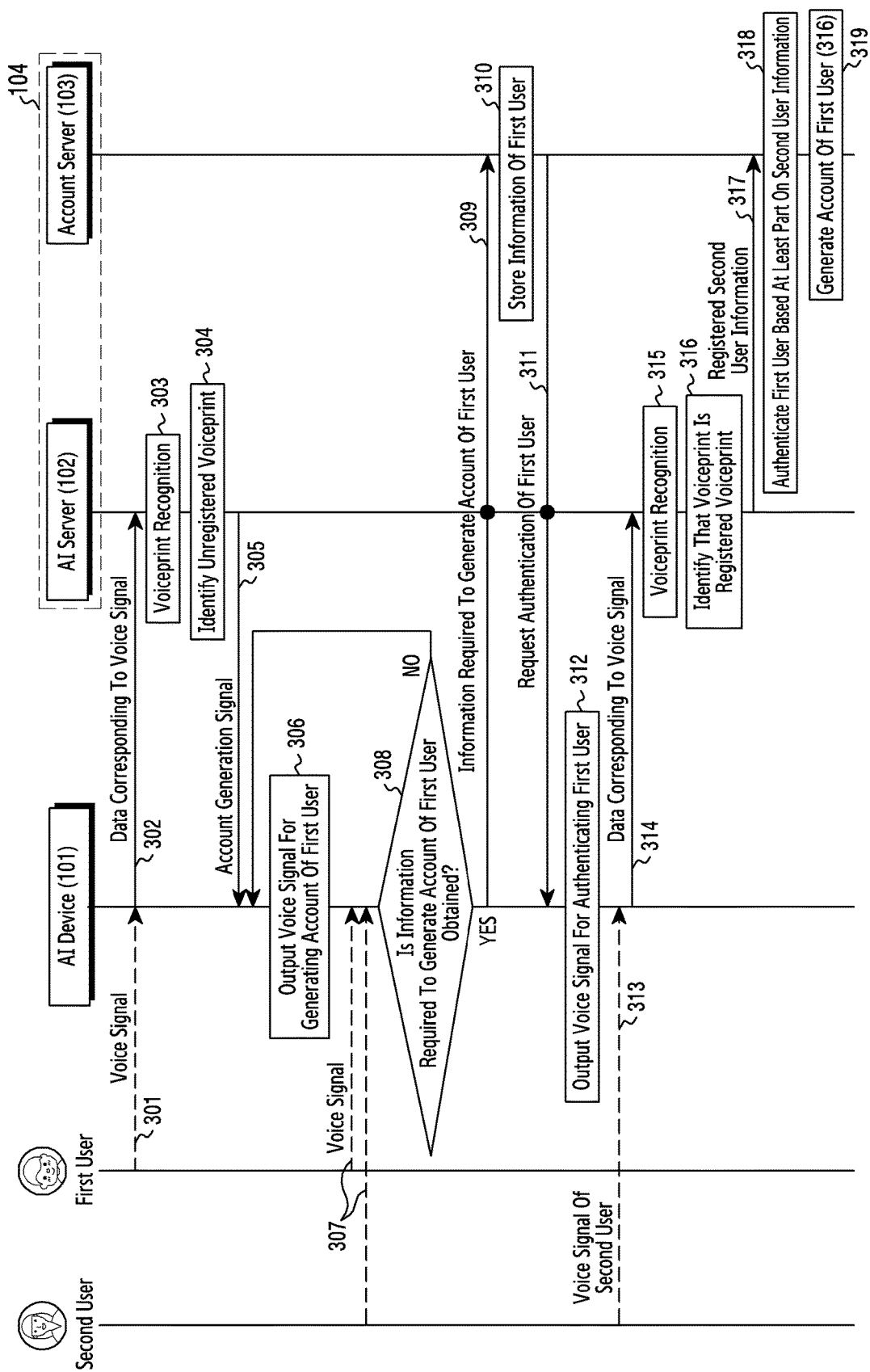
FIG. 3 is a view illustrating an example of a signal flow among the AI device, the AI server, and the account server according to certain embodiments.

FIG. 3 illustrates an example of a signal flow among the AI device 101, the AI server 102, and the account server 103 according to certain embodiments. According to an embodiment, the AI server 102 and the account server 103 may be integrated into one server 104.

Referring to FIG. 3, in operation 301, the AI device 101 may obtain a voice signal through the microphone 271. The voice signal may be speech uttered by a certain user (for example, the first user). According to an embodiment, the voice signal of the first user may also be an utterance or speech outputted from another electronic device (for example, another AI speaker).

In operation 302, the AI device 101 may transmit data (for example, a digital audio signal) corresponding to the voice signal to the AI server 102 through the communication module 290. The AI server 102 may receive the data corresponding to the voice signal that the AI device 101 obtained from the user.

In operation 303, the AI server 102 may perform voiceprint recognition by using the received data. The voiceprint recognition may include identifying a voice corresponding to the voice signal. The AI server 102 may store voiceprint information for users already registered to use the AI device 101. The AI server 102 may identify whether the user uttering the voice signal is a registered user or an unregistered user, based on attempting to match the voice signal with the stored voiceprint information.

In operation 304, the AI server 102 may identify that a voiceprint corresponding to the voice signal is an unregistered voiceprint based on the voiceprint recognition. In other words, the AI server 102 may identify that the first user uttering the voice signal is an unregistered user. The AI server 102 may store (or temporarily store) the voiceprint information in response to it being identified that the voiceprint corresponding to the voice signal is an unregistered voiceprint.

In operation 305, the AI server 102 may transmit an account generation signal to the AI device 101, based on it being identified that the voiceprint corresponding to the voice signal is an unregistered voiceprint, such that the AI device 101 proceeds with an account generation process for the first user (who uttered the voice signal).

In some embodiments, the AI device 101 may be an AI speaker which is installed in a home. The AI server 102 may accumulate data or voiceprint information corresponding to the voice signal over a designated period (for example, 1 week) to identify whether the first user uttering the voice signal is a family member or a temporary guest. The AI server 102 may identify that the first user is a family member in response to the voiceprint of the first user being identified with a designated frequency, over a designated period, or a designated number of times or more. The AI server 102 may transmit the account generation signal for generating an account of the first user to the AI device 101 in response to the voiceprint of the first user being identified with the designated frequency, over the designated period, or the designated number of times or more.

According to an embodiment, the account generation signal may correspond to audio data (for example, a statement) for outputting through the speaker 272 in the AI device 101. For example, the account generation signal may be audio data such as "You are new here. Who are you?" or "Do you want me to register?" The AI device 101 may perform a registering process of the first user based on audio data received from the AI server 102 thereafter.

According to another embodiment, the account generation signal may be a control signal for causing the AI device 101 to start the account generation process of the first user. The AI device 101 may output a designated voice signal to generate the account of the first user in response to the account generation signal (that is, the control signal) being received. For example, the voice signal to be outputted from the AI device 101 may be "You are new here. Who are you?" or "Do you want me to begin registration?", and may be generated at the AI device 101 or may be pre-designated and stored.

In operation 306, the AI device 101 may output the speech prompting generation of the account of the first user in response to the account generation signal being received from the AI server 102. The speech outputted from the AI device 101 may be, for example, a statement inducing generation of the account of the first user (for example, "Do you want me to register?"), or a statement asking for information necessary for generation of the account of the first user (for example, "What is your name?"), but this should not be considered as limiting.

In operation 307, the AI device 101 may receive a speech of the first user responding to the speech outputted for generation of the account of the user. However, this should not be considered as limiting. The AI device 101 may receive a voice signal of the second user as a response to the speech outputted for generation of the account of the first user. For example, in response to the question of the AI device 101, "Do you want me to begin registration?", the first user may say "Yes" or the already registered second user (for example, another family member) may say "Yes."

In operation 308, the AI device 101 may identify whether information required to generate the account of the first user is present. The information required to generate the account of the first user may include a minimal degree of information necessary for generating the account (or temporary account) of the first user, such as the last name, first name of the first user. When the information required to generate the account of the first user is not present (e.g., by a failure to obtain the information), the AI device 101 may return to operation 306 to output speech requesting information necessary for generation of the account of the first user as a voice signal for generating the account of the first user. For example, the AI device 101 may output speech such as "What is your name?" in operation 306, and may receive a speech saying the name of the first user from the first user or the second user in operation 307.

In operations 306 to 308, conversational statements exchanged between the AI device 101 and the user (for example, the first user or the second user) may be displayed. According to an embodiment, in operations 306 to 308, the AI device 101 may have statements with the user by outputting a designated voice signal based on data pre-stored in the AI device 101. According to another embodiment, in operations 306 to 308, the AI device 101 may have statements with the user based on communication with the AI server 102. In this case, the AI device 101 may statements with the user by transmitting a user's voice signal to the AI server 102 and receiving audio data responding to the user's voice signal from the AI server 102, and outputting the audio data through the speaker 272.

In some embodiments, the conversational statements between the AI device 101 and the user (for example, the first user or the second user) in operations 306 to 308 may include the AI device 101 questioning about a relationship between the unregistered first user and the already registered second user. Based on a user's answer to the question, the AI device 101 may obtain information regarding the relationship between the unregistered first user and the already registered second user (for example, son, mother).

In addition, when a voice signal of the already registered second user is received during operations 306 to 308, the AI device 101 may identify the second user existing in the same space as the first user. For example, the AI server 102 may receive data corresponding to the voice signal of the second user from the AI device 101, may identify the already registered second user through voiceprint recognition, and may identify that the second user is in the same space as the first user.

When it is identified that the information (for example, the last name, first name) required to generate the account of the first user is present (e.g., obtained) in operation 308, the AI device 101 may proceed to operation 309 to transmit the information required to generate the account of the first user to the AI server 102. The AI server 102 may receive the information required to generate the account of the first user from the AI device 101. The AI server 102 may transmit the received information (for example, the name of the first user) to the account server 103 to generate the account of the first user. For example, the AI server 102 may transmit data indicating the name of the first user and the voiceprint information of the first user which is stored (or temporarily stored) in the AI server 102 to the account server 103, such that the account server 103 generates the account (or temporary account) of the first user. The account server 103 may receive the data indicating the name of the first user and the voiceprint information of the first user from the AI server 102. According to an embodiment, the AI server 102 and the account server 103 may be integrated into one server 104.

In operation 310, the account server 103 may store the information pertinent to the first user, as received from the AI server 102 (or received from the AI device 101). For example, the account server 103 may store the name of the first user and the voiceprint information of the first user to generate the account of the first user. The account generation process of the first user may be completed when the first user is authenticated through operations 311 to 318.

In operation 311, the account server 103 may request authentication of the first user to complete the generation of the account of the first user. The account server 103 may transmit a signal requesting authentication of the first user to the AI device 101 through the AI server 102, such that the AI device 101 outputs a voice signal requesting authentication of the first user. For example, the account server 103 may transmit the signal requesting authentication of the first user to the AI server 102 in response to the information (for example, the name of the first user, the voiceprint information of the first user) required to generate the account of the first user being received from the AI server 102. The AI server 102 may receive the signal requesting authentication of the first user from the account server 103. In response to receiving the signal, the AI server 102 may transmit the signal requesting authentication of the first user to the AI device 101. The AI device 101 may receive the signal requesting authentication of the first user from the AI server 102.

According to an embodiment, the signal requesting authentication of the first user, received by the AI device 101 from the AI server 102, may correspond to audio data (such as, for example, statement) for output through the speaker 272 at the AI device 101. For example, the AI device 101 may output a voice signal corresponding to the audio data requesting authentication of the first user, received from the AI server 102.

According to another embodiment, the signal requesting authentication of the first user may be a control signal for causing the AI device 101 to request authentication of the first user. The AI device 101 may output a designated voice signal to request authentication of the first user in response to the authentication request signal (that is, the control signal) being received.

In operation 312, the AI device 101 may output the voice signal for authenticating the first user in response to the signal requesting authentication of the first user being received from the AI server 102. The voice signal outputted from the AI device 101 to authenticate the first user may include a request for the already registered second user to authenticate the first user.

The voice signal outputted from the AI device 101 to authenticate the first user may be a statement inducing authentication of the first user (for example, "Please authenticate!"). However, this disclosure is not limited to this example, and the AI device 101 may output a designated statement to authenticate the first user. For example, the AI device 101 may output a designated statement asking about a relationship with the already registered second user, as a part of the authentication procedure of the first user. The AI device 101 may perform at least part of the authentication procedure of the first user based on an answer of the already registered second user being received with respect to the designated statement. For example, at least part of the authentication procedure of the first user may be performed, when it is identified that a voiceprint responding to the designated statement is the voiceprint of the already registered second user.

In certain embodiments, the AI device 101 may request the already registered second user to authenticate the first user to register the first user. The AI device 101 may output a voice or statement for requesting the already registered second user to authenticate the first user to authenticate the first user.

In some embodiments, the AI device 101 may output a voice signal guiding the already registered second user to utter a designated sentence to authenticate the first user. For example, the designated sentence may a passphrase which is pre-set by the second user. In another example, the designated sentence may be a sentence which is suggested by the AI device 101.

In some other embodiments, the AI device 101 may output a voice signal guiding the already registered second user to perform authentication through the user device 105 of the second user to authenticate the first user. The authentication through the user device 105 of the second user may include authentication using biometric recognition (for example, face recognition, fingerprint recognition, iris recognition), authentication using a pattern, authentication using a PIN, authentication using a password, authentication using a message or email, or authentication provided by a certificate authority or a communication operator. A detailed operation of the authentication through the user device 105 of the second user will be described below with reference to FIG. 5.

In operation 313, the AI device 101 may obtain a voice signal of the already registered second user in response to the voice signal for authenticating the first user. For example, the second user may utter the pre-set passphrase or may utter a sentence suggested by the AI device 101 in operation 312. However, this should not be considered as limiting. For example, when the AI device 101 outputs a designated statement asking about the relationship with the already registered second user, as a part of the authentication procedure of the first user, the second user may answer about the relationship with the first user (for example, "This is my son" or "He calls me mother"). The AI device 101 (or the AI server 102) may authenticate or register the first user based at least on obtaining the relationship between the first user and the second user.

In operation 314, the AI device 101 may transmit data corresponding to the voice signal of the second user obtained to the AI server 102 through the communication module 290. The AI server 102 may receive the data corresponding to the voice signal of the second user from the AI device 101.

In operation 315, the AI server 102 may perform voiceprint recognition by using the received data. The AI server 102 may store voiceprint information of users already registered to use the AI device 101.

In operation 316, the AI server 102 may identify that the user uttering the voice signal is already registered, based on the pre-stored voiceprint information. In addition, the AI server 102 may identify that the voice signal of the second user indicates that the second user has authenticated the first user. For example, the AI server 102 may identify that the voice signal of the second user matches utterance of the designated phrase (for example, a passphrase or a sentence suggested by the AI device 101). The AI server 102 may authenticate the first user based on it being identified that the user uttering the voice signal matches the already registered second user and the voice signal matches utterance of the designated phrase. However, this should not be considered as limiting. The AI server 102 may authenticate the first user seamlessly simply by identifying that a voiceprint obtained during the statement with the AI device 101 is the voiceprint of the already registered second user.

In some embodiments in which the AI server 102 and the account server 103 are integrated into one server 104, the server 104 may complete the authentication of the first user in operation 316. For example, the server 104 may complete the authentication of the first user based on the voice signal of the second user being received from the AI device 101 in operation 314, and may generate the account of the first user and may store information of the account of the first user (for example, name, voiceprint, relationship with the second user, etc.).

In some other embodiments in which the AI server 102 and the account server 103 are separated from each other, the AI server 102 may transmit information indicating the already registered second user to the account server 103, based on it being identified that the voiceprint is the voiceprint of the already registered second user through voiceprint recognition. The account server 103 may receive the information indicating the already registered second user from the AI server 102.

In operation 318, the account server 103 may complete authentication of the first user based on the information indicating the second user. For example, the account server 103 may store information regarding accounts of registered users. The account server 103 may identify the already registered second user based on the information regarding the accounts of the registered users, and may complete the authentication of the first user based on the identification.

In operation 319, the account server 103 may generate the account of the first user based on determining that the authentication of the first user is completed. The account server 103 may store information regarding the account of the first user (for example, the profile of the first user). The account server 103 may store, as the profile of the first user, the information regarding the first user (for example, the first name, last name, voiceprint information, relationship with the already registered second user) obtained through the dialogue between the AI device 101 and the first user (or second user) in operations 306 to 308.

In certain embodiments, even when the first user is a child or an elderly person who does not have a personal device, the first user can be easily registered through dialogue with the AI device 101 by authenticating the new first user by the already registered second user. According to an embodiment, the AI device 101 (or the AI server 102) may authenticate the first user based on the account of the already registered second user, based at least on obtaining the relationship between the already registered second user and the unregistered first user. For example, the AI device 101 (or the AI server 102) may authenticate and register the first user based on it being identified that the first user is the son of the already registered second user.

In certain embodiments, there may be various aspects, forms, or ranges of accounts. For example, there may be a formal account which has all information necessary for the account. The information necessary for the account may include sex, name, birth date, or email of a user. The account of the already registered second user may be the above-described formal account. The account of the already registered second user may be generated through communication between the user device 105 of the second user and the account server 103.

In another example, for a user having no email, there may be a temporary account having minimal information of the information necessary for the account. The temporary account may temporarily (for example, randomly) generate and store an email with respect to the user having no email. In addition, the minimal information of the information necessary for the account may be at least one of the sex, name, or birth date of the user. For example, when the first user is a child or an elderly person having no email, the account of the first user may be the above-described temporary account. For example, the account server 103 may temporarily (for example, randomly) generate an email of the first user, and may generate the account (that is, the temporary account) of the first user by using the generated temporary email and the minimal information of the first user (for example, the name of the first user).

In still another example, there may be an account of a profile concept. The account of the profile concept may be registered only for a specific device (for example, the AI device 101, an AI speaker, a family hub, an IoT device, or the like) such that the account is not generally used and is used only for the specific device. For example, the account of the first user may be generated as the profile concept as described above.

In yet another example, there may be a sub account associated with a specific account. The sub account may be associated with an already registered formal account (for example, as a sub structure). For example, the account of the first user may be generated as a sub account of the account of the already registered second user.

As described above, various aspects of accounts may include at least one of a formal account, a temporary account, an account of a profile concept, or a sub account, but are not limited thereto. For example, the account of the first user may be generated in the form of at least one of the temporary account, the account of the profile concept, or the sub account, such that the first user having no email can be registered to use the AI device 101.

Figure 4:
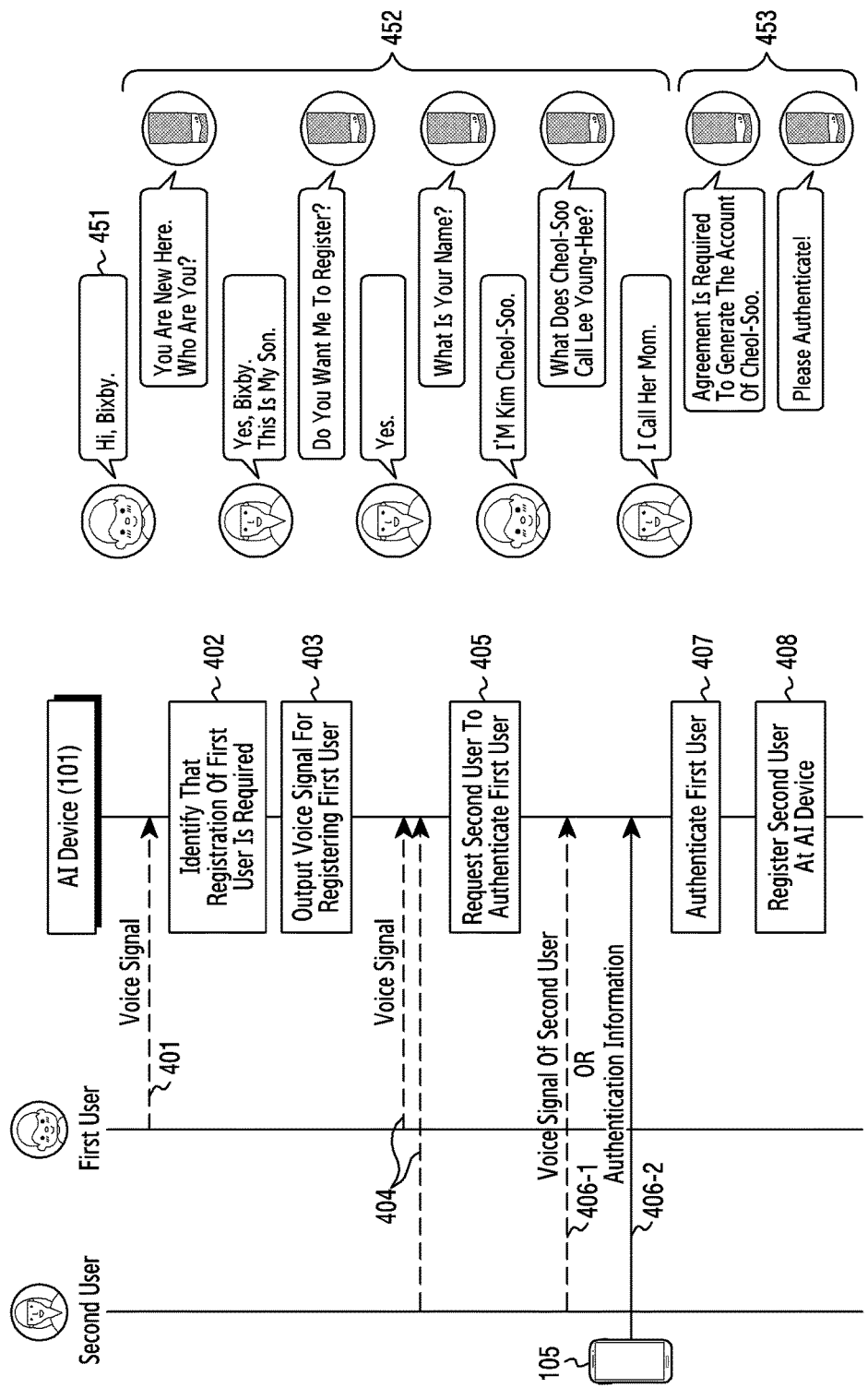
FIG. 4 is a view illustrating an example of an operation of the AI device according to certain embodiments.

FIG. 4 illustrates an example of an operation of the AI device 101 according to certain embodiments. According to some embodiments, at least part of the operations of the AI server 102 and the account server 103 of FIG. 3 may be performed by the AI device 101.

Referring to FIG. 4, in operation 401, the AI device 101 may obtain a voice signal through the microphone 271. The voice signal may be a voice signal uttered by a certain user (for example, the first user). For example, the voice signal uttered by the user may correspond to a statement 451 of the first user. The voice signal uttered by the user may be a plurality of statements including the statement 451.

In operation 402, the AI device 101 may identify that the registration of the first user is required based on the obtained voice signal.

In some embodiments, the AI device 101 may identify that the registration of the first user is required, based on it being identified that the first user uttering the obtained voice signal is an unregistered user. The AI device 101 may identify that the registration of the first user is required, based on it being identified that the first user uttering the voice signal is different from the already registered second user. For example, when the voice signal of the unregistered first user is obtained (or accumulated) a designated number of times or more, the AI device 101 may identify that the registration of the first user is required. When the voice signal of the unregistered first user is obtained over a designated period or longer, the AI device 101 may identify that the registration of the first user is required. When the voice signal of the unregistered first user is obtained a designated number of times or more (that is, with a designated frequency or more) over the designated period, the AI device 101 may identify that the registration of the first user is required. The AI device 101 may identify that the first user is a family member of the home where the AI device 101 is installed, based on the voice signal of the unregistered first user being obtained with the designated frequency, over the designated period, and/or the designated number of times or more.

In some other embodiments, the AI device 101 may identify that the registration of the first user is required, in response to a voice signal of the first user or a voice signal of the second user requesting the registration of the first user (for example, "Please register!") being obtained.

In operation 403, the AI device 101 may output a voice signal for registering the first user through the speaker 272 in response to it being identified that the registration of the first user is required. The voice signal may be a voice signal inducing the start of a registration process of the first (for example, "Do you want me to register?"). The voice signal may be a voice signal asking for information necessary for generation of an account of the first user (for example, a name, a relationship with the already registered second user). For example, the AI device 101 may output a voice signal asking the name of the first user. The AI device 101 may output a voice signal asking about a relationship between the first user and the already registered second user.

In operation 404, the AI device 101 may obtain a voice signal from the first user or the second user through the microphone 271. The voice signal may be a voice signal of the first user or the second user answering the question of the AI device 101.

Operations 403 and 404 may be performed multiple times. For example, the AI device 101 may repeat operations 403 and 404 until minimal information necessary for generation of the account of the first user is obtained. The minimal information necessary for generation of the account of the first user may include at least one of the name of the first user or the relationship between the first user and the already registered second user. For example, operations 403 and 404 may correspond to statements 452.

When the information necessary for generation of the account of the first user is obtained, the AI device 101 may request the already registered second user to authenticate the first user in operation 405. For example, the AI device 101 may identify that the already registered second user exists in the same space as the first user, based on a voice signal of the second user being obtained in operations 403 and 404. The AI device 101 may seamlessly identify the second user based on the voice signal of the already registered second user being obtained in operations 403 and 404. The AI device 101 may identify the name of the second user (for example, "Lee Young-hee"), based on voiceprint recognition regarding the voice signal of the second user. The AI device 101 may request the second user to authenticate the first user based on the identification.

The operation of the AI device 101 requesting the second user to authenticate the first user may include an operation of outputting a voice signal inducing the second user to authenticate. The voice signal inducing the second user to authenticate may correspond to statements 453, for example.

In some embodiments, the method for the second user to authenticate the first user may include, for example, authentication using a passphrase pre-set by the second user. For example, in operation 405, the AI device 101 may output a voice signal saying "Lee Young-hee, please authenticate by the passphrase." The AI device 101 may receive a voice signal of the second user uttering the designated passphrase in operation 406-1.

In some other embodiments, the method for the second user to authenticate the first user may include, for example, authenticating by using a sentence suggested by the AI device 101. For example, in operation 405, the AI device 101 may output a voice signal saying "Lee Young-hee, please say 'Hi bixby, I agree.'" The AI device 101 may receive a voice signal of the second user uttering the sentence suggested by the AI device 101 in operation 406-1.

In some other embodiments, the method for the second user to authenticate the first user may include authenticating through the user device 105 of the second user. According to circumstances, authenticating through the user device 105 of the second user may be performed when authentication through the voice signal of the second user (operation 406-1) fails. Alternatively, authentication through the user device 105 of the second user may be performed when a voice signal of the second user is not obtained a designated number of times or more with respect to the operation (405) of the AI device 101 requesting the second user to authenticate. The authentication through the user device 105 of the second user may include authentication using biometric recognition (for example, face recognition, fingerprint recognition, iris recognition), authentication using a pattern, authentication using a PIN, authentication using a password, authentication using a message or email, or authentication provided by a certificate authority or a communication operator. For example, in operation 405, the AI device 101 may output a voice signal saying "Lee Young-hee, please check your smartphone." The AI device 101 may receive authentication information from the user device 105 of the second user in operation 406-2. A specific operation of authentication through the user device 105 of the second user will be described below with reference to FIG. 5.

In operation 407, the AI device 101 may authenticate the first user in response to at least one of the voice signal of the second user being received in operation 406-1 or the authentication information being received from the user device 105 of the second user in operation 406-2. The new first user is authenticated by the already registered second user, such that the first user can be easily registered through conversational dialogue with the AI device 101 even when the first user is a child or an elderly person having no personal device.

In operation 408, the AI device 101 may register the first user to use the AI device 101. The AI device 101 may generate an account of the first user. The AI device 101 may store information regarding the first user that is obtained through conversational dialogue with the first user or the second user as information of the account of the first user (for example, a profile). The information regarding the first user that is obtained through the conversational dialogue with the first user or the second user may include the name of the first user, the voiceprint information of the first user, the relationship between the first user and the second user, or the appellations that the first user and the second user call each other.

At least part of the operations of the AI device 101 illustrated in FIG. 4 may be performed by the AI server 102 or the account server 103.

Figure 5:
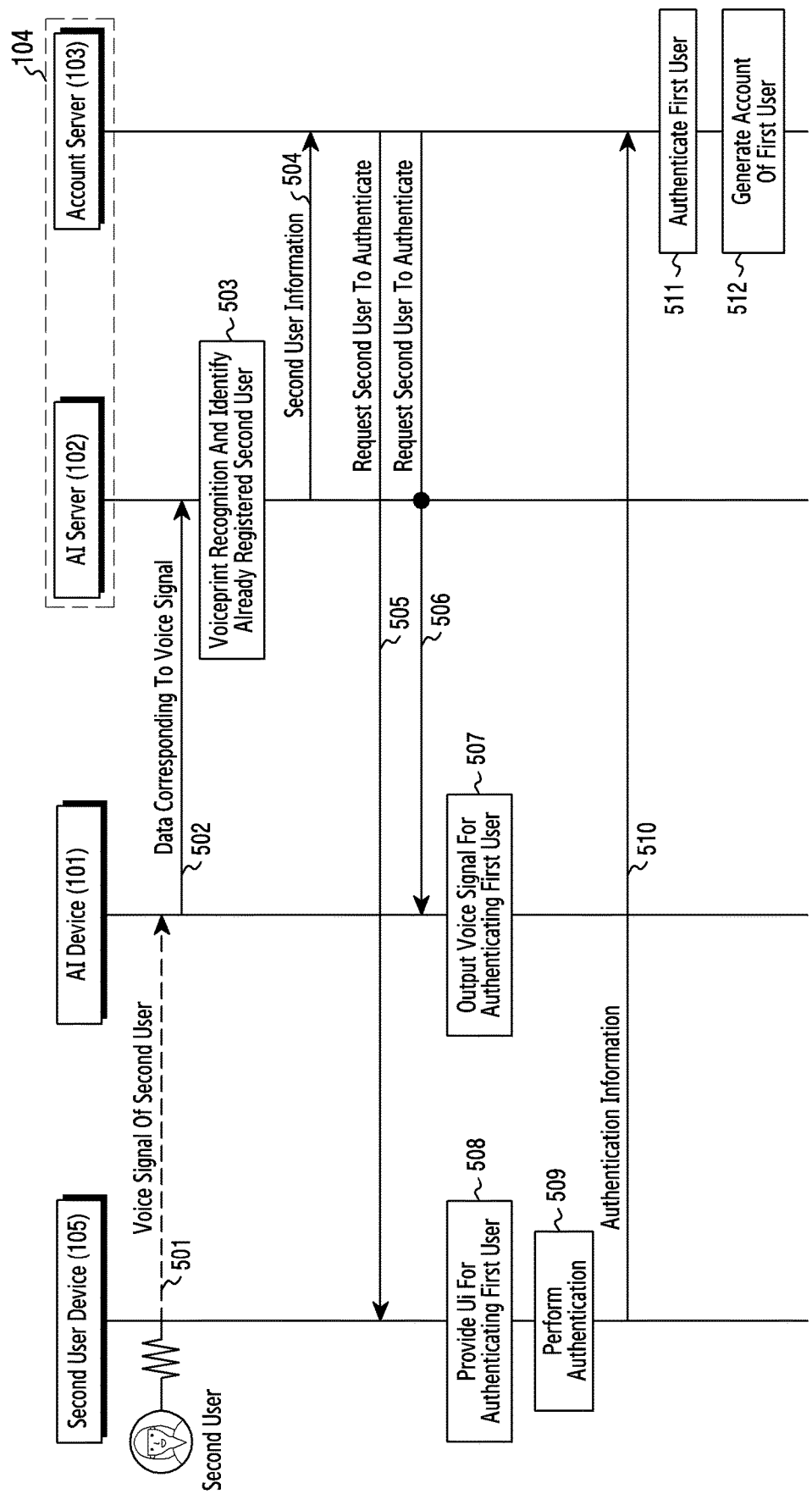
FIG. 5 is a view illustrating an example of a signal flow among the AI device, the AI server, and the account server, for authenticating a first user by using a device of a second user according to certain embodiments.

FIG. 5 illustrates an example of a signal flow among the AI device 101, the AI server 102, and the account server 103, for authenticating the first user by using the device 105 of the second user according to certain embodiments.

Operations illustrated in FIG. 5 may correspond to the operation of authenticating the first user after obtaining the information necessary for generation of the account of the first user in FIG. 3 or 4. The operations illustrated in FIG. 5 may correspond to the method of authenticating the first user through the user device 105 of the second user among various methods of authenticating the first user by the second user.

Referring to FIG. 5, in operation 501, the AI device 101 may obtain a voice signal of the second user. The voice signal of the second user may be obtained from conversational dialogue with the AI device 101 for registering the first user. For example, the voice signal of the second user may be obtained by an answer of the second user from the statements for registering the first user. Operation 501 may correspond to operation 307 of FIG. 3 or operation 404 of FIG. 4.

In operation 502, the AI device 101 may transmit data corresponding to the voice signal of the second user to the AI server 102. The AI server 102 may receive the data corresponding to the voice signal of the second user.

In operation 503, the AI server 102 may perform voiceprint recognition with respect to the data corresponding to the received voice signal. The AI server 102 may identify that the user uttering the voice signal is the already registered second user, based on the voiceprint recognition.

In operation 504, the AI server 102 may transmit information regarding the identified second user to the account server 103. The account server 103 may receive the information regarding the second user from the AI server 102. The account server 103 may identify the account of the second user and may identify the user device 105 of the second user based on the reception.

In operation 505, the account server 103 may transmit a signal requesting the identified user device 105 of the second user to authenticate, as an operation of requesting the second user to authenticate.

In operation 506, the server 104 may transmit the signal requesting the second user to authenticate to the AI server 102, such that the AI device 101 outputs a voice signal for authenticating the first user. For example, the account server 103 may transmit the signal requesting the second user to authenticate to the AI server 102, and the AI server 102 may transmit audio data to the AI device 101 to request the second user to authenticate.

In operation 507, the AI device 101 may output a voice signal for authenticating the first user in response to the authentication request signal being received from the AI server 102 (or the account server 103). For example, the AI device 101 may output a voice signal saying "Lee Young-hee, please check your smartphone."

In operation 508, the second user device 105 may provide a user interface (UI) for authenticating the first user in response to the authentication request signal being received from the account server 103. For example, the second user device 105 may display the UI for authenticating the first user through a display of the second user device 105.

In operation 509, the second user device 105 may authenticate the first user by the second user. For example, the second user device 105 may perform biometric recognition (for example, face recognition, fingerprint recognition, iris recognition) of the second user, may receive a pattern pre-designated by the second user, may perform authentication by using a PIN of the second user, may receive a password pre-designated by the second user, may perform authentication by using a message or an email of the second user, or may perform authentication provided by a certificate authority or a communication operator. However, this should not be considered as limiting.

In operation 510, the second user device 105 may transmit information indicating the result of authentication by the second user to the account server 103. The account server 103 may receive the information indicating the result of authentication by the second user from the second user device 105.

In operation 511, the account server 103 may complete the authentication process of the first user based on the reception.

In operation 512, the account server 105 may generate the account of the first user based on the first user being normally authenticated by the second user. Operation 512 may correspond to operation 319 of FIG. 3 or operation 408 of FIG. 4.

According to some embodiments, the AI server 102 and the account server 103 may be integrated into one server 104. According to some embodiments, at least part of the operations of the AI server 102 and the account server 103 may be performed by the AI device 101.

Figure 6:
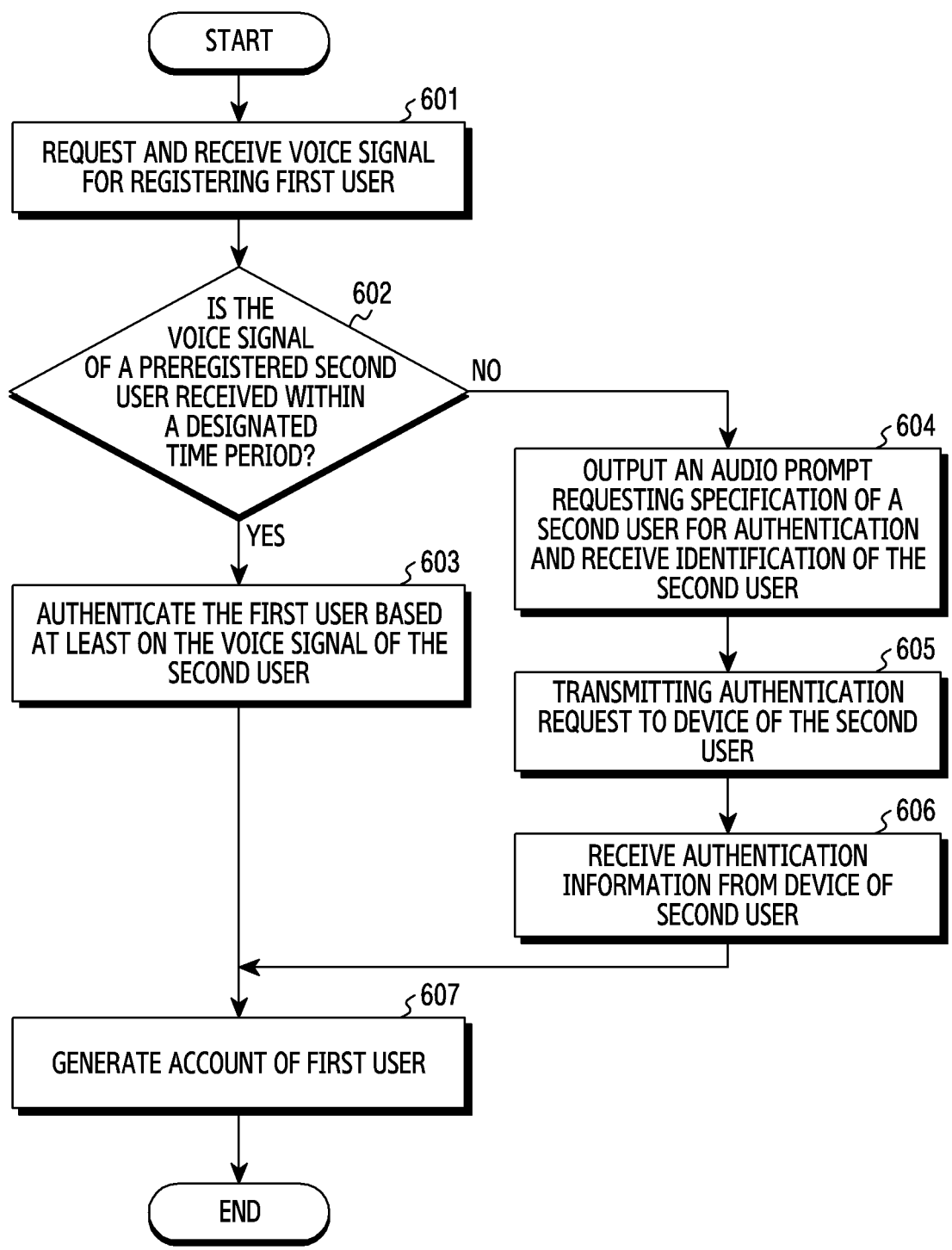
FIG. 6 is a view illustrating an example of an operation for requesting the second user to authenticate the first user in the AI device according to whether the second user and the first user are in the same space according to certain embodiments.

FIG. 6 illustrates an example of an operation for requesting the second user to authenticate the first user in the AI device 101 according to whether the second user and the first user are in the same space according to certain embodiments. Operations of FIG. 6 may be performed by the processor 220 of the AI device 101. At least part of the operations of FIG. 6 may be performed by the AI server 102 or the account server 103.

Referring to FIG. 6, in operation 601, the AI device 101 may output a voice signal for registering the first user, and may receive a response to the voice signal. Outputting and receiving the voice signal may indicate statements spoken or output between the AI device 101 and a certain user (for example, the first user or the second user) for registering the first user. Operation 601 may correspond to operation 306 to 308 of FIG. 3. Operation 601 may correspond to operation 403 and 404 of FIG. 4. Operation 601 may correspond to statements 451 and 452 of FIG. 4.

In operation 602, the AI device 101 may identify whether a voice signal of the already registered second user is received within a designated period. For example, the AI device 101 may identify whether a voice signal of the already registered second user is received during a designated number of statements or for a designated time (for example, for a few minutes). The identification may be performed based on communication with the AI server 102. For example, the AI device 101 may transmit the obtained voice signal to the AI server 102, and the AI server 102 may identify whether the voice signal is a voice signal of the already registered second user through voiceprint recognition.

Based on it being identified that the voice signal of the already registered second user is received within the designated period, the AI device 101 may identify that the already registered second user is in the same space as the first user. Accordingly, based on it being identified that the voice signal of the already registered second user is received within the designated period, the AI device 101 may authenticate the first user based on at least part of the voice signal of the second user in operation 603. The operation of authenticating the first user based on at least part of the voice signal of the second user may correspond to the authentication methods described in FIGS. 3 to 5. The operation of authenticating the first user based on at least part of the voice signal of the second user may be authenticating the first user based at least part on conversational statements with the second user.

Based on it being identified that the voice signal of the second user is not received within the designated period, the AI device 101 may identify that the already registered second user is not in the same space as the first user. Accordingly, the AI device 101 may proceed to operation 604 to output a voice signal for specifying the second user to request authentication. For example, the AI device 101 may output a voice signal saying "Who do I ask to authenticate?" The AI device 101 may receive a response to the voice signal. For example, the AI device 101 may obtain a voice signal saying "Please ask my mom, Lee Young-hee, to authenticate." from the first user. The AI device 101 may specify the second user to request authentication, based on the voice signal being obtained. For example, the AI server 102 or the account server 103 may identify the second user named "Lee Young-hee" among users registered with respect to the AI device 101, and the second user device 105.

In operation 605, the AI device 101 (or the AI server 102 or the account server 103) may request the specified second user device 105 to authenticate. For example, the AI device 101 may transmit a signal for requesting authentication of the first user to the second user device 105 which is identified based on the voice signal of the first user obtained. Operation 605 may correspond to operation 505 of FIG. 5, for example.

In operation 606, the AI device 101 may receive authentication information from the second user device 105. The AI device (or the AI server 102 or the account server 103) may receive information indicating the result of authentication by the second user from the second user device 105. For example, the result of authentication received from the second user device 105 may include a result of authentication based on biometric recognition (for example, face recognition, fingerprint recognition, iris recognition) of the second user, a result of authentication based on a pattern, a result of authentication based on a PIN, a result of authentication based on a password, or a result of authentication based on a message or email of the second user. Operation 606 may correspond to operation 510 of FIG. 5, for example. The AI device 101 (or the AI server 102 or the account server 103) may authenticate the first user based on the result of authentication received from the second user device 105.

In operation 607, the AI device 101 may generate the account of the first user in response to the first user being authenticated in operation 603 or 606.

Figure 7:
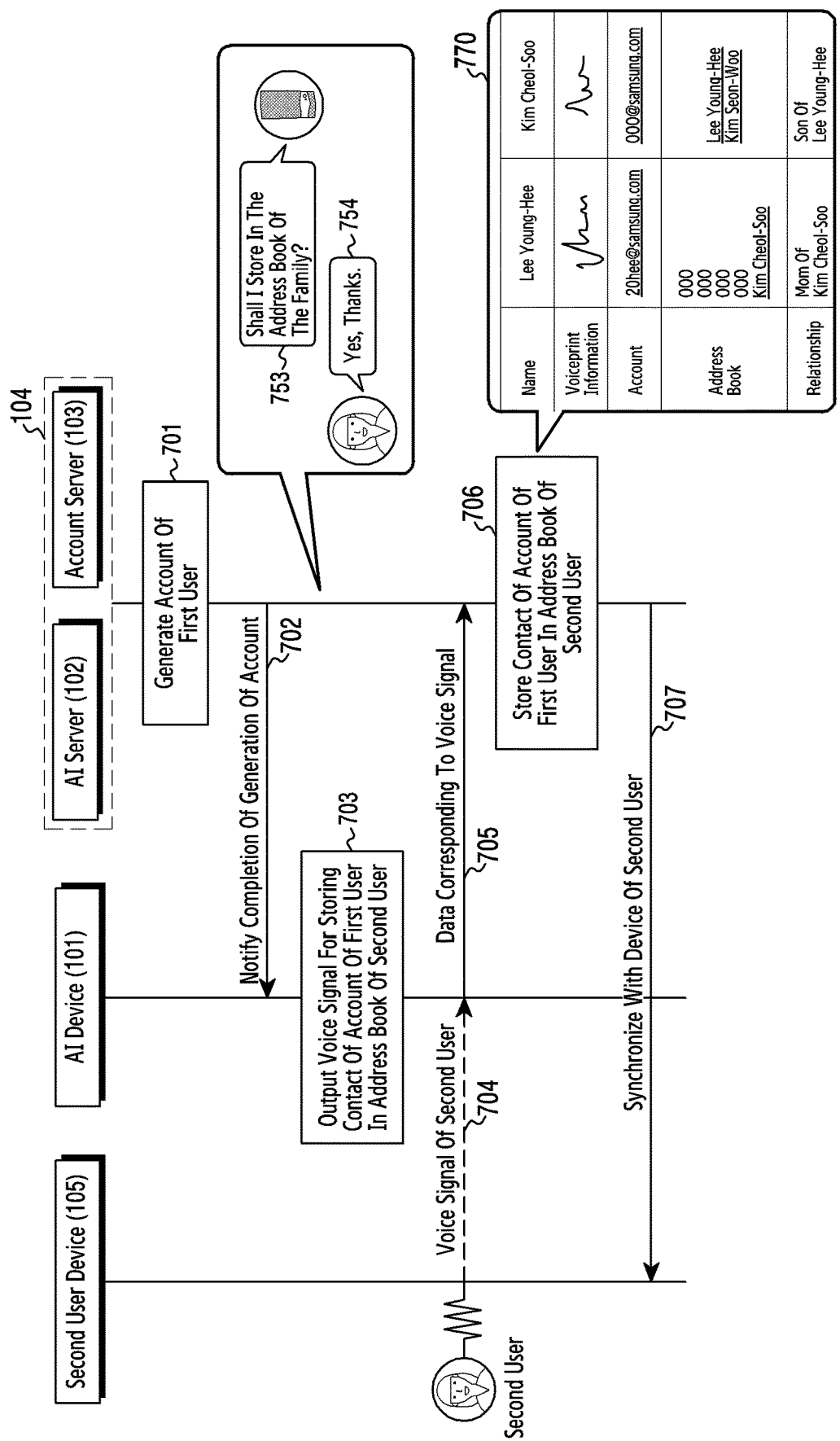
FIG. 7 is a view illustrating an example of a signal flow among the AI device, the AI server, and the account server, for performing an additional operation in relation to the registration of the first user according to certain embodiments.

FIG. 7 illustrates an example of a signal flow among the AI device 101, the AI server 102, and the account server 103, for performing an additional operation in relation with the registration of the first user according to certain embodiments. In FIG. 7, the AI server 102 and the account server 103 may be integrated into one server 104. Operations illustrated in FIG. 7 may be performed after the account of the first user is generated in FIGS. 3 to 6.

Referring to FIG. 7, in operation 701, the server 104 (for example, the account server 103) may generate the account of the first user. Operation 701 may correspond to operation 319 of FIG. 3, operation 408 of FIG. 4, operation 512 of FIG. 5, or operation 607 of FIG. 6.

In operation 702, the server 104 may notify the AI device 101 that the generation of the account of the first user is completed. For example, the account server 103 may transmit a signal indicating that the generation of the account of the first user is completed to the AI device 101 through the AI server 102. The AI device 101 may receive the signal indicating that the generation of the account of the first user is completed from the server 104.

In operation 703, the AI device 101 may output a voice signal for storing a contact regarding the account of the first user in an address book of the second user device 105. For example, the AI device 101 may output a voice signal corresponding to audio data received from the AI server 102. In another example, the AI device 101 may output a designated voice signal in response to the account generation completion signal of the first user being received. The voice signal may be a voice signal of the AI device 101, saying "Shall I store in the address book of the family?" as a statement 753. In some embodiments, the first user may not own a personal device (for example, a smartphone). In this case, the contact regarding the account of the first user may indicate identification information for calling the AI device 101. In some other embodiments, when the first user owns a personal device (for example, a smartphone), the contact regarding the account of the first user may be a phone number of the personal device.

In operation 704, the AI device 101 may obtain a voice signal of the second user in response to the voice signal. For example, the AI device 101 may obtain a voice signal of the second user, saying "Yes, Thanks." as a statement 754.

In operation 705, the AI device 101 may transmit data corresponding to the obtained voice signal to the server 104. For example, the AI device 101 may transmit data corresponding to the voice signal to the AI server 102. The AI server 102 may transmit, to the account server 103, a signal for storing the contact regarding the account of the first user in the address book of the second user device 105, based on the identification of the voice signal.

In operation 706, the server 104 (for example, the account server 103) may store the contact regarding the account of the first user in the address book of the second user device 105. For example, referring to a database 770, the contact of the first user (that is, Kim Cheol-soo) may be stored in the address book of the second user (that is, Lee Young-hee). In addition, the contact of the second user (that is, Lee Young-hee) may be stored in the address book of the first user (that is, Kim Cheol-soo).

In some embodiments, when the first user does not own a personal device or information regarding a personal device of the first user is not registered, the server 104 may store identification information for calling the AI device 101 as a contact of the first user.

In some other embodiment, when information regarding a personal device of the first user is registered, the server 104 may automatically add the contact of the first user to the address book of the second user.

In operation 707, the server 104 may transmit a signal for synchronizing the contact regarding the account of the first user with the second user device 105 to the second user device 105. The second user device 105 receiving the synchronization signal may automatically store (update) the contact regarding the account of the first user in the book address of the second user device 105.

Figure 8:
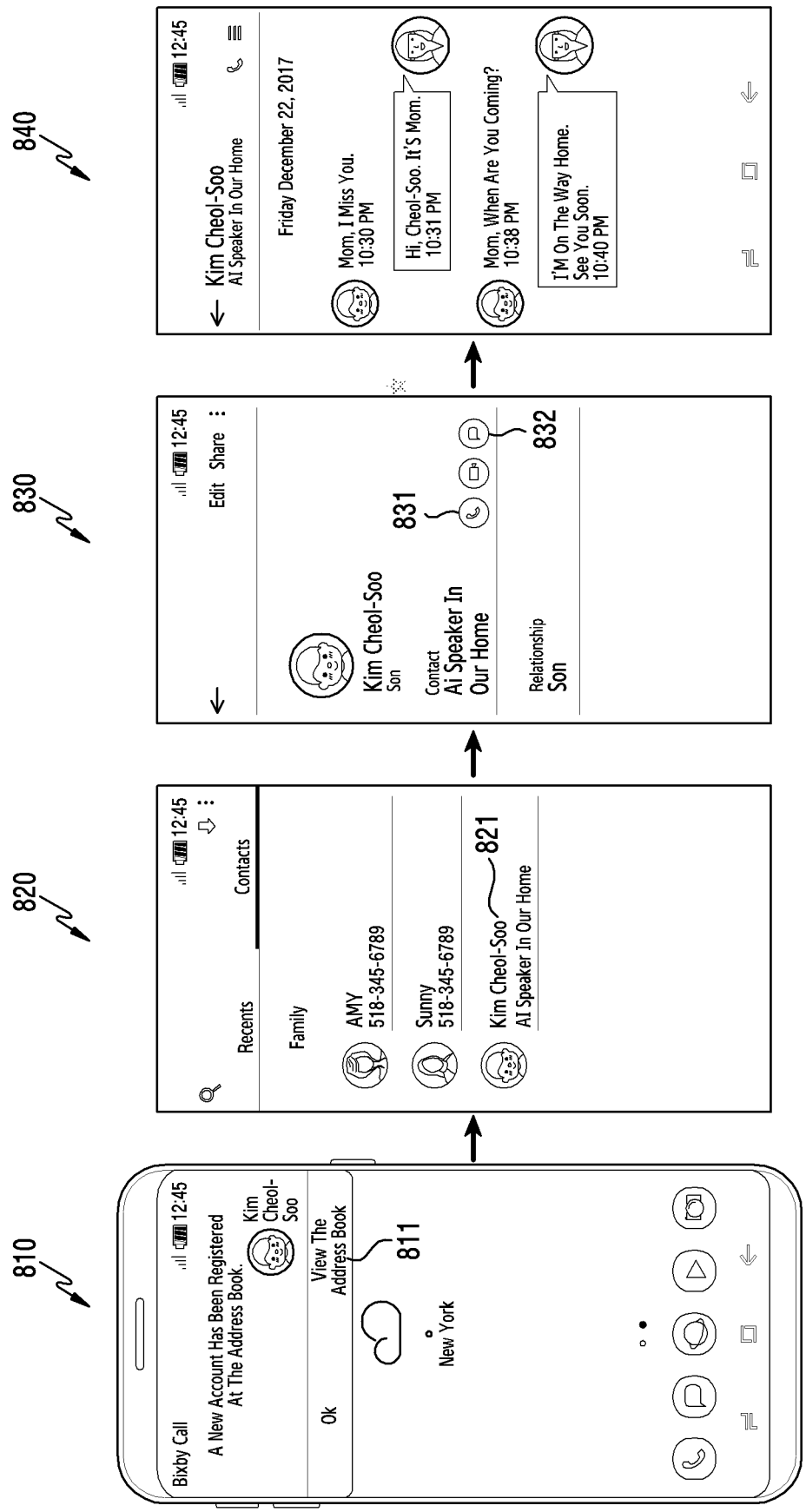
FIG. 8 is a view illustrating an example of a screen related to a contact of the first user stored in an address book of the second user device according to certain embodiments.

FIG. 8 illustrates an example of a screen related to the contact of the first user stored in the address book of the second user device 105 according to certain embodiments. The screen illustrated in FIG. 8 may be a screen that is displayed on the user device 105 of the second user.

Referring to FIG. 8, the second user device 105 may display a screen 810 in response to the contact of the first user being registered at the second user device 105 (for example, operation 707 of FIG. 7). The screen 810 may include a notification indicating that the account of the first user (that is, Kim Cheol-soo) is registered at the address book of the second user device 105. For example, in response to a user input on an icon 811 for displaying the address book being received on the screen 810, the second user device 105 may display a screen 820 converted from the screen 810.

The screen 820 may be a screen displaying the address book related to the AI device 101. The screen 820 may include items indicating contacts of users registered at the AI device 101. The second user device 105 may display the screen 820 showing that the contact of the first user (that is, Kim Cheol-soo) newly registered at the AI device 101 is updated. In response to a user input on an item 821 indicating the contact of the first user newly registered at the AI device 101 being received on the screen 820, the second user device 105 may display a screen 830 converted from the screen 820.

The screen 830 may be a screen regarding the contact of the first user. The screen 830 may include an icon 831 for calling the first user and an icon 832 for exchanging a text-based message with the first user. The second user device 105 may call a device corresponding to the contact of the first user, in response to a user input on the icon 831 being received. The device corresponding to the contact of the first user may include, for example, the AI device 101 or a personal device (for example, a smartphone) of the first user.

In some embodiments, when the first user does not own a personal device or information regarding a personal device of the first user is not registered, identification information for calling the AI device 101 may be stored as the contact of the first user. In this case, the second user device 105 may call the AI device 101 in response to the user input on the icon 831 being received. Accordingly, the second user may talk to the first user existing in the same space as the AI device 101.

In some other embodiments, a phone number of a personal device of the first user may be stored as the contact of the first user. In this case, the second user device 105 may call the personal device of the first user in response to the user input on the icon 831 being received.

The second user device 105 may display a screen 840 on which the second user exchanges message with the first user, in response to a user input on the icon 832 for exchanging messages with the first user being received on the screen 830.

In some embodiments, when the identification information of the AI device 101 is stored as the contact of the first user, the second user device 105 may transmit a message to the AI device 101 based on a message input of the second user through the screen 840. The AI device 101 may output a voice signal corresponding to the message received from the second user device 105. The AI device 101 may obtain a voice signal of the first user responding to the voice signal. The voice signal of the first user may be converted into text data by the AI server 102, for example. The text data may be transmitted to the second user device 105 and may be displayed through the screen 840. By the above-described process, the second user may exchange messages with the first user through the AI device 101.

Figure 9:
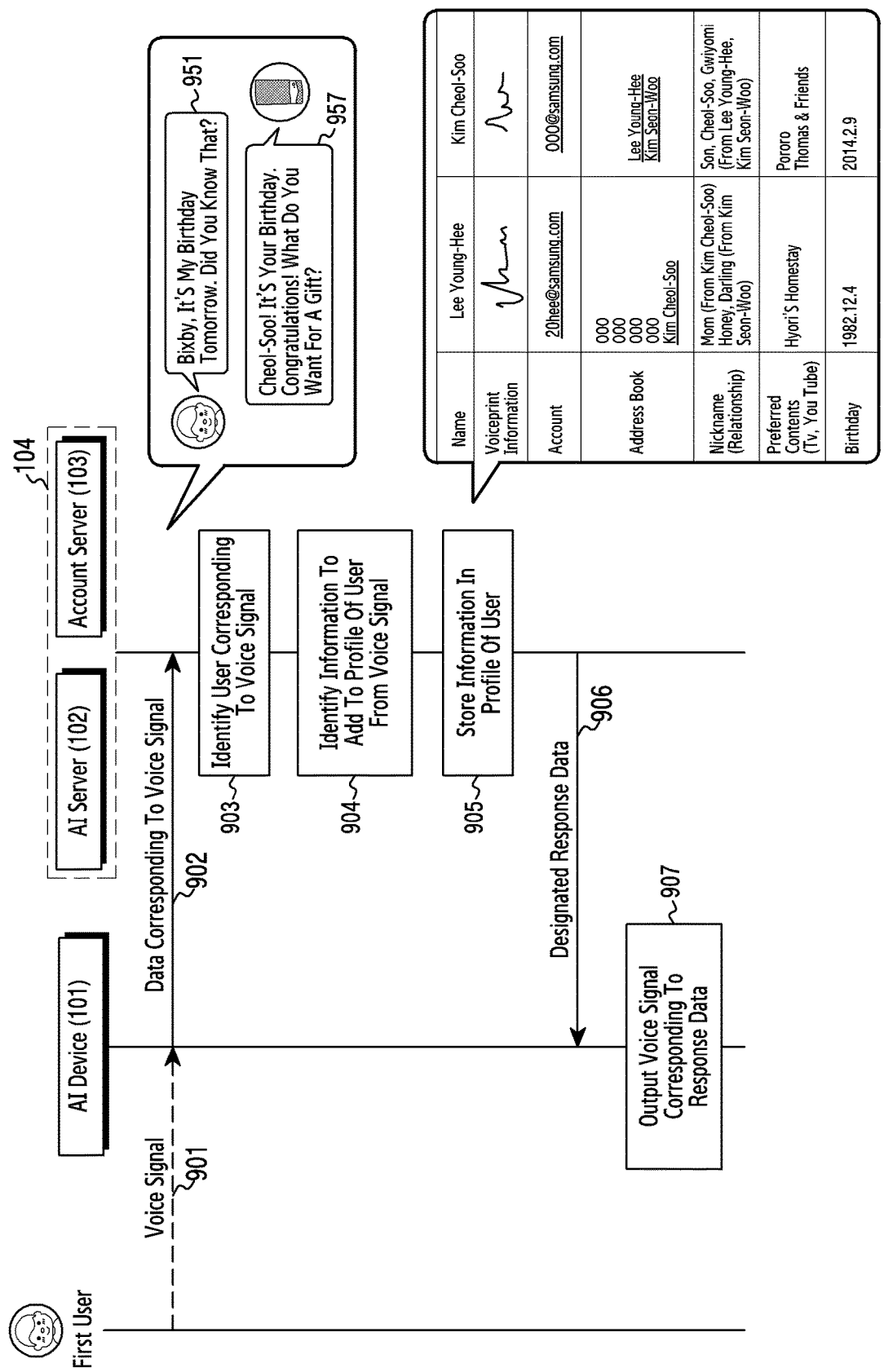
FIG. 9 is a view illustrating an example of a signal flow among the AI device, the AI server, and the account server, for performing other additional operation in relation to the registration of the first user according to certain embodiments.

FIG. 9 illustrates an example of a signal flow among the AI device 101, the AI server 102, and the account server 103, for performing additional other operations in relation to the registration of the first user according to certain embodiments. In FIG. 9, the AI server 102 and the account server 103 may be integrated into one server 104. Operations illustrated in FIG. 9 may be performed after the account of the first user is generated in FIGS. 3 to 6.

Referring to FIG. 9, in operation 901, the AI device 101 may obtain a voice signal of the newly registered first user. The voice signal may be, for example, a voice signal of the first user saying "Bixby, it's my birthday tomorrow. Did you know that?" as a statement 951.

In operation 902, the AI device 101 may transmit data corresponding to the voice signal of the first user to the server 104.

In operation 903, the server 104 may identify the user corresponding to the voice signal. For example, the AI server 102 may identify that the user uttering the voice signal is the first user, based on voiceprint recognition.

In operation 904, the server 104 (for example, the AI server 102) may identify information to be added to the profile of the identified first user, based on semantic analysis of the voice signal. For example, the AI server 102 may identify the birthday of the first user from the statement 951 to add to the profile of the first user.

In operation 905, the server 104 (for example, the account server 103) may store the identified information in the profile of the identified first user. For example, the AI server 102 may transmit data indicating the birthday of the first user to the account server 103. The account server 103 may receive the data indicating the birthday of the first user from the AI server 102. The account server 103 may store the birthday of the first user in the account of the first user based on the reception.

In operation 906, the server 104 (for example, the AI server 102) may transmit designated response data responding to the voice signal (for example, the statement 951) of the first user to the AI device 101. The AI device 101 may receive the designated response data (for example, audio data) from the AI server 102.

In operation 907, the AI device 101 may output a voice signal corresponding to the response data in response to the response data being received from the AI server 102. For example, the AI device 101 may output a voice signal saying "Cheol-soo, happy birthday!" as a statement 957 as a response to the user's voice signal.

As in the operations illustrated in FIG. 9, information may be added to the profile of the registered user through conversation between the registered user and the AI device 101. Alternatively, the AI device 101 may add information to profiles of registered users by identifying conversational statements between the plurality of users registered. Information to be added to the profile of a user may include, for example, registered user's birthday, a TV content desired by the registered user, a You Tube content desired by the registered user, or nicknames (or appellations) that the plurality of registered users call one another. For example, when a TV, which is an IoT device, is operated in association with the AI device 101, information such as a TV content desired by the user may be used to control the TV through the AI device 101.

Certain embodiments are not limited thereto. For example, when the AI device 101 is installed in a hotel room, a guest staying the hotel room may be registered as a user for using the AI device 101. In this case, the AI device 101 may output a voice signal asking the registered user about a period of use (for example, "How long are you going to stay here?"). The AI device 101 may set the period of use of the registered user based on a voice signal of the user (for example, "I will stay here for 3 days.") received as a response to the voice signal. The AI device 101 may give the user authority to use the AI device 101 during the set period of use.

Figure 10:
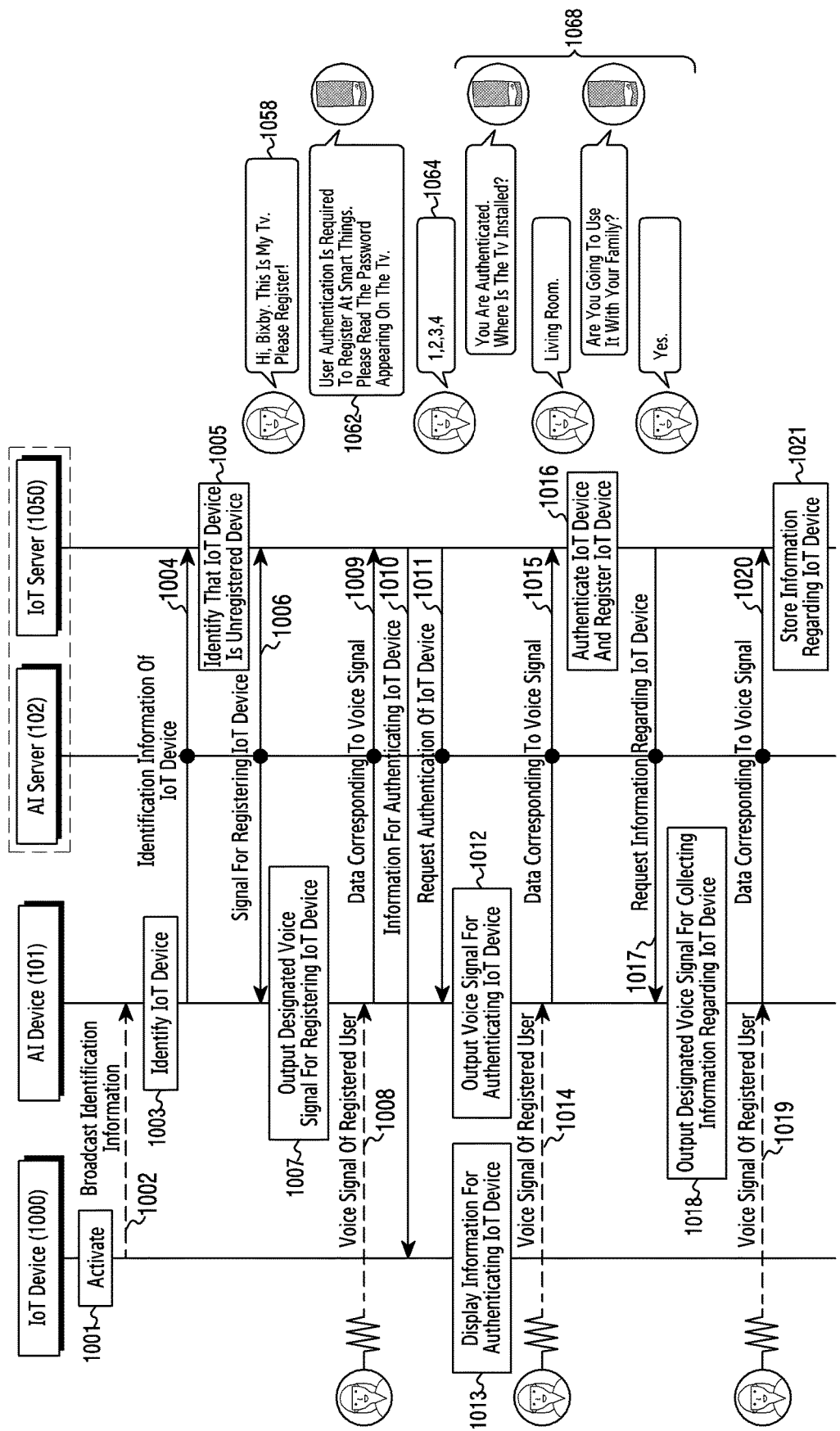
FIG. 10 is a view illustrating an example of a signal flow among the AI device, the AI server, an IoT device, and an IoT server for registering the IoT device according to certain embodiments.

FIG. 10 illustrates an example of a signal flow among the AI device 101, the AI server 102, an IoT device 1000, and an IoT server 1050, for registering the IoT device 1000 according to certain embodiments.

In certain embodiments, the IoT device (for example, an air cleaner, an air conditioner, a TV, etc.) may be registered in association with the AI device 101. When the IoT device is registered at the AI device 101, a user may control the registered IoT device through the AI device 101 based on a voice signal. In FIG. 10, an example of an operation for registering the IoT device through statements with the AI device 101 is illustrated.

Referring to FIG. 10, in operation 1001, the IoT device 1000 may be activated. For example, the operation of the IoT device 1000 being activated may include an operation of the IoT device 1000 being initially turned on after being installed in a home.

In operation 1002, the IoT device 1000 may broadcast its own identification information. The AI device 101 may receive the identification information broadcasted by the IoT device 1000. For example, the AI device 101 may perform a hub function of the IoT device 1000.

In operation 1003, the AI device 101 may identify the IoT device 1000. For example, the AI device 101 may identify the IoT device 1000 as a hub for the IoT device 1000.

In operation 1004, the AI device 101 may transmit the identification information of the IoT device 1000 to the IoT server 1050. For example, the AI device 101 may transmit the identification information of the IoT device 1000 to the IoT server 1050 through the AI server 102. However, this should not be considered as limiting, and the AI device 101 may directly transmit the identification information of the IoT device 1000 to the IoT server 1050.

In operation 1005, the IoT server 1050 may identify that the IoT device 1000 is an unregistered device.

In operation 1006, the IoT server 1050 may transmit a signal for registering the IoT device 1000 to the AI device 101 based on the identification. For example, the IoT server 1050 may transmit a control signal for initiating a registration process of the IoT device 1000 to the AI server 102. The AI server 102 may receive the control signal for initiating the registration process of the IoT device 1000 from the IoT server 1050. The AI server 102 may transmit a control signal for initiating the registration process of the IoT device 1000 to the AI device 101, or may transmit audio data for registering the IoT device 1000 to the AI device 101, in response to the control signal being received.

In operation 1007, the AI device 101 may output a voice signal in response to the signal for registering the IoT device 1000 being received from the AI server 102 (or the IoT server 1050). In some embodiments, the AI device 101 may output a pre-designated voice signal in response to the control signal for initiating the registration process of the IoT device 1000 being received from the AI server 102. In some other embodiments, the AI device 101 may output a voice signal corresponding to the audio data in response to the audio data for registering the IoT device 1000 being received from the AI server 102. The voice signal outputted from the AI device 101 may be, for example, a voice signal saying "A new device has been searched. Do you want me to register?"

In operation 1008, the AI device 101 may obtain a voice signal from a registered user. For example, the voice signal may be a voice signal indicating agreement on the registration of the IoT device 1000. The voice signal may be a voice signal of the registered user, "Yes, please register!"

In operation 1009, the AI device 101 may transmit data corresponding to the voice signal of the registered user to the AI server 102. The AI server 102 may transmit data indicating intent to register the IoT device 1000 to the IoT server 1050, based on sematic analysis of the voice signal. The IoT server 1050 may initiate the registration process of the IoT device 1000 in response to the data being received. The registration process of the IoT device 1000 may include operations of requesting a registered user to authenticate and of receiving authentication from the registered user.

However, this should not be considered as limiting. According to some embodiments, the registration process of the IoT device 1000 may be initiated by a voice signal of a registered user. For example, the registration process of the IoT device 1000 may be initiated in response to a voice signal of a registered user, saying "This is my TV, please register!" as a statement 1058.

In operation 1010, the IoT server 1050 may transmit information for authenticating the IoT device 1000 to the IoT device 1000. The information may be, for example, a password or passphrase, and may be outputted or displayed through the IoT device 1000.

In operation 1011, the IoT server 1050 may transmit a signal requesting authentication of the IoT device 1000 to the AI device 101. For example, the IoT server 1050 may transmit a signal requesting authentication of the IoT device 1000 to the AI server 102. The AI server 102 may receive the signal requesting authentication of the IoT device 1000 from the IoT server 1050. The AI server 102 may transmit a control signal requesting authentication of the IoT device 1000 to the AI device 101, or may transmit audio data requesting authentication of the IoT device 1000 to the AI device 101, in response to the signal being received. The AI device 101 may receive the control signal or the audio data from the AI server 102.

In operation 1012, the AI device 101 may output a voice signal for authenticating the IoT device 1000 in response to the reception. For example, the voice signal may be a voice signal of the AI device 101 saying "Please read the password appearing on the TV." as a statement 1062.

In operation 1013, the IoT device 1000 may display the information for authenticating the IoT device 1000 in response to the information being received from the IoT server 1050. For example, the IoT device 1000 may display or output the password or passphrase received from the IoT server 1050.

In operation 1014, the AI device 101 may receive a voice signal of the registered user. The voice signal may be a voice signal saying the password displayed on the IoT device 1000, for example. The voice signal may correspond to a statement 1064.

In operation 1015, the AI device 101 may transmit data corresponding to the voice signal to the AI server 102. The AI server 102 may identify that the registered user authenticates the IoT device 1000, based on the data corresponding to the voice signal (for example, utterance of the password) being received. The AI server 102 may transmit data indicating that the IoT device 1000 is authenticated to the IoT server 1050. The IoT server 1050 may receive the data indicating that the IoT device 1000 is authenticated from the AI server 102.

In operation 1016, the IoT server 1050 may authenticate the IoT device 1000, based on the reception, and may register the IoT device 1000. Thereafter, an operation of obtaining additional information regarding the IoT device 1000 may be performed.

In operation 1017, the IoT server 1050 may request information regarding the IoT device 1000 from the AI device 101 through the AI server 102. The information regarding the IoT device 1000 may include, for example, a place where the IoT device 1000 is installed, a user that the IoT server 1050 will give authority to use the IoT device 1000, or an owner of the IoT device 1000.

In operation 1018, the AI device 101 may output a designated voice signal for collecting the information regarding the IoT device 1000. The voice signal may include a question "Where is the TV installed?" or "Are you going to use it with your family?"

In operation 1019, the AI device 101 may obtain a voice signal of the registered user in response to the voice signal. In operation 1020, the AI device 101 may transmit data corresponding to the voice signal to the IoT server 1050 through the AI server 102. In operation 1021, the IoT server 1050 may store the information regarding the IoT device 1000. For example, the IoT server 1050 may store a user that the IoT server 1050 will give the authority regarding the IoT device 1000, as the information regarding the IoT device 1000, and may give authority to control the IoT device 1000 specifically to the stored user.

Operations 1017 to 1021 may be repeated, and for example, may correspond to statements 1068.

According to certain embodiments as described above, an electronic device (for example, the AI device 101) may include: a speaker (for example, the speaker 272); a microphone (for example, the microphone 271); and at least one processor (for example, the processor 220) configured to: determine whether registration of a first user is required based on a voice signal obtained through the microphone; based on it being identified that the registration of the first user is required, request a second user registered at the electronic device to authenticate the first user; and, based on the first user being authenticated by the second user, register the first user.

In certain embodiments, the voice signal obtained through the microphone may include a voice signal of the first user, and the at least one processor may identify that the registration of the first user is required, based on it being identified that the voice signal obtained through the microphone is different from a voice signal of the second user registered at the electronic device.

In certain embodiments, the at least one processor may output a voice signal requesting the second user to authenticate through the speaker in order to request the second user to authenticate the first user.

In certain embodiments, the at least one processor may authenticate the first user based on a voice signal indicating a designated phrase being obtained from the second user through the microphone.

In certain embodiments, the at least one processor may authenticate the first user based on authentication information being received from a device of the second user (for example, the user device 105).

In certain embodiments, the at least one processor may authenticate the first user based at least part on a voice signal regarding a relationship between the first user and the second user being obtained, may generate an account of the first user to register the first user, and may store information regarding the relationship between the first user and the second user in association with the account of the first user.

In certain embodiments, the at least one processor may transmit a signal for requesting the second user to authenticate the first user to a device of the second user, based on it being identified that a voice signal of the second user is not obtained within a designated time from a time when the voice signal is obtained through the microphone.

In certain embodiments, the at least one processor may store identification information for accessing the electronic device as a contact of the first user, based on the first user being registered.

In certain embodiments, the at least one processor may, in response to an unregistered external device (for example, the IoT device 1000) being identified, output a voice signal for registering the external device through the speaker, and may register the external device at the electronic device based at least on a voice signal of a user registered at the electronic device being received in response to the voice signal. For example, the at least one processor may transmit information for using for authentication of the external device to the external device, and may register the external device at the electronic device, based on a voice signal corresponding to the information being received from the user registered at the electronic device through the microphone.

According to certain embodiments of the disclosure, a new user can be simply registered by registering the new user through authentication by a registered user.

While specific embodiments have been described in the detailed description of the disclosure, it will be understood by those skilled in the art that various changes may be made therein without departing from the disclosure. Therefore, the scope of the disclosure should be defined not by the embodiments described above but by the appended claims or equivalents to the claims.

What is claimed is:

1. An electronic device comprising:
a speaker;
a microphone;
at least one processor; and
a memory storing programming instructions, the programming instructions executable by the at least one processor to cause the electronic device to:
identify whether registration of a first user is required based on a first voice signal of the first user obtained through the microphone, wherein it is identified that the registration of the first user is required when the first voice signal of the first user is obtained a designated number of times or more, over a designated period or longer, or a designated frequency or more over the designated period;
when the registration of the first user is required, requesting authentication of the first user by a second user preregistered at the electronic device; and
when information authenticating the first user by the second user is received, register the first user based on the received information.

2. The electronic device of claim 1, wherein the first voice signal comprises speech uttered by the first user, and wherein the programming instructions are further executable by the at least one processor to cause the electronic device to:
identify that the registration of the first user is required, when detecting that the first voice signal is different from a second voice signal corresponding to the second user preregistered at the electronic device.

3. The electronic device of claim 1, wherein the programming instructions are further executable by the at least one processor to cause the electronic device to:
before requesting the authentication of the first user by the second user, output a second voice signal requesting authentication of the second user through the speaker.

4. The electronic device of claim 1, wherein the received information authenticating the first user includes a second voice signal indicating a predesignated phrase.

5. The electronic device of claim 1, further comprising a communication circuit, wherein the received information authenticating the first user includes a transmission from an external electronic device associated with the second user, the transmission received via the communication circuit.

6. The electronic device of claim 1,
wherein the received information authenticating the first user includes at least a second voice signal indicating a relationship between the first user and the second user, and
wherein registering the first user includes generating an account for the first user, and storing the indicated relationship between the first user and the second user in association with the generated account.

7. The electronic device of claim 1, further comprising a communication circuit, wherein the programming instructions are further executable by the at least one processor to cause the electronic device to:
when the information authenticating the first user is not received within a predesignated time period of obtaining the first voice signal, transmit, by the communication circuit, a signal requesting authentication of the first user to an external electronic device associated with the second user.

8. The electronic device of claim 1, wherein registering the first user further includes storing identification information for accessing the electronic device as a contact of the first user.

9. The electronic device of claim 1, wherein the programming instructions are further executable by the at least one processor to cause the electronic device to:
in response to detecting an unregistered external device, output a second voice signal prompting registration of the unregistered external device through the speaker; and
register the unregistered external device at the electronic device based at least on receiving a third voice signal of any user preregistered at the electronic device.

10. The electronic device of claim 9, wherein the programming instructions are further executable by the at least one processor to cause the electronic device to:
  transmit a signal for registering the unregistered external device to the unregistered external device; and
  wherein registration of the unregistered external device at the electronic device is further based on a third voice signal received through the microphone, the third voice signal corresponding to information received from any user registered at the electronic device.

11. A method in an electronic device, the method comprising:
  identifying, by a processor of the electronic device, whether registration of a first user is required based on a first voice signal of the first user obtained through a microphone of the electronic device, wherein it is identified that the registration of the first user is required when the first voice signal of the first user is obtained a designated number of times or more, over a designated period or longer, or a designated frequency or more over the designated period;
  when the registration of the first user is required, requesting, by the processor, authentication of the first user by a second user preregistered at the electronic device; and
  when information authenticating the first user by the second user is received, registering, by the processor, the first user based on the received information.

12. The method of claim 11,
  wherein the registration of the first user is required when the first voice signal of the first user is different from a second voice signal of the second user preregistered at the electronic device.

13. The method of claim 11, wherein requesting the second user to authenticate the first user further comprises an audio signal output through a speaker of the electronic device.

14. The method of claim 11, wherein the information authenticating the first user comprises a second voice signal indicating a predesignated phrase, received from the second user through the microphone.

15. The method of claim 11, wherein the information authenticating the first user comprises authentication information received by transmission from an external electronic device associated with the second user, the authentication information received through a communication circuit of the electronic device.

16. The method of claim 11,
  wherein the information authenticating the first user includes a second voice signal indicating a relationship between the first user and the second user, and
  wherein registering the first user includes generating an account of the first user and storing information indicating the relationship between the first user and the second user in association with the generated account.

17. The method of claim 11, wherein requesting authentication of the first user by the second user further comprises:
  when the information authenticating the first user is not received within a predesignated time period of obtaining the first voice signal, transmitting a signal to an external electronic device associated with the second user through a communication circuit of the electronic device, the signal requesting authentication of the first user.

18. The method of claim 11, wherein registering the first user further comprises storing identification information for accessing the electronic device as a contact of the first user.

19. The method of claim 11, further comprising:
  in response to detecting an unregistered external device, outputting a second voice signal prompting registration of the unregistered external device through a speaker of the electronic device; and
  registering the unregistered external device at the electronic device based at least on receiving a third voice signal of any user preregistered at the electronic device.

20. The method of claim 19, further comprising:
  transmitting a signal for registering the unregistered external device to the unregistered external device,
  wherein registration of the external device at the electronic device is further based on a third voice signal received through the microphone, the third voice signal corresponding to information received from any user registered at the electronic device.

* * * * *